United States Patent
Chen et al.

(10) Patent No.: US 12,301,857 B2
(45) Date of Patent: May 13, 2025

(54) METHOD AND APPARATUS OF HARMONIZING TRIANGULAR MERGE MODE WITH WEIGHTED PREDICTION

(71) Applicant: HUAWEI TECHNOLOGIES CO., LTD., Shenzhen (CN)

(72) Inventors: Huanbang Chen, Shenzhen (CN); Haitao Yang, Shenzhen (CN); Alexey Konstantinovich Filippov, Moscow (RU); Vasily Alexeevich Rufitskiy, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 17/716,410

(22) Filed: Apr. 8, 2022

(65) Prior Publication Data
US 2022/0248044 A1 Aug. 4, 2022

Related U.S. Application Data

(63) Continuation of application No. PCT/CN2020/120027, filed on Oct. 9, 2020.
(Continued)

(51) Int. Cl.
*H04N 19/503* (2014.01)
*H04N 19/105* (2014.01)
(Continued)

(52) U.S. Cl.
CPC ......... *H04N 19/503* (2014.11); *H04N 19/105* (2014.11); *H04N 19/109* (2014.11);
(Continued)

(58) Field of Classification Search
CPC .. H04N 19/503; H04N 19/105; H04N 19/109; H04N 19/136; H04N 19/174;
(Continued)

(56) References Cited

U.S. PATENT DOCUMENTS

| 2015/0189323 A1 | 7/2015 | An et al. |
| 2016/0255359 A1* | 9/2016 | Yu .......................... H04N 19/46 375/240.15 |
| 2023/0353723 A1* | 11/2023 | Sun ....................... H04N 19/137 |

FOREIGN PATENT DOCUMENTS

| CN | 108702516 A | 10/2018 |
| CN | 109076235 A | 12/2018 |
| WO | 2021061027 A1 | 4/2021 |

OTHER PUBLICATIONS

Document: JVET-M0328_v4, Fangdong Chen et al, CE10-related: Simplified Triangle Prediction Unit Mode, Joint Video Experts Team (JVET) of ITU-T SG 16 WP 3 and ISO/IEC JTC 1/SC 29/WG 11, 13th Meeting: Marrakech, MA, Jan. 9-18, 2019, 8 pages.
(Continued)

*Primary Examiner* — Kyle M Lotfi
(74) *Attorney, Agent, or Firm* — Rimon PC

(57) ABSTRACT

The present disclosure relates to moving picture processing, and in particular, to cases where non-rectangular partitioning modes are used for inter-prediction in a combination with weighted prediction (WP) for coding fades. Non-rectangular modes refer to those inter-prediction modes, in which case a current block is partitioned/sliced in a non-rectangular way (slices). Such modes may be triangular (TMP) or geometric (GEO) prediction. The aim of the disclosure is to harmonize non-rectangular partitioning modes with WP by way of disabling TMP/GEO when WP is applied. This may be accomplished by checking whether all reference pictures for a current slice are disabled, and if this is the case to disable the slice-level WP for non-rectangular prediction units. Whether the reference pictures are disabled may be determined based on conditions applied on set values, for example, of luma/chroma flags, which refer to the reference pictures.

18 Claims, 20 Drawing Sheets

Related U.S. Application Data

(60) Provisional application No. 62/913,711, filed on Oct. 10, 2019, provisional application No. 62/913,219, filed on Oct. 10, 2019.

(51) Int. Cl.
    *H04N 19/109*      (2014.01)
    *H04N 19/119*      (2014.01)
    *H04N 19/126*      (2014.01)
    *H04N 19/136*      (2014.01)
    *H04N 19/174*      (2014.01)
    *H04N 19/176*      (2014.01)
    *H04N 19/186*      (2014.01)
    *H04N 19/70*      (2014.01)

(52) U.S. Cl.
CPC ......... *H04N 19/136* (2014.11); *H04N 19/174* (2014.11); *H04N 19/176* (2014.11); *H04N 19/186* (2014.11); *H04N 19/119* (2014.11); *H04N 19/126* (2014.11); *H04N 19/70* (2014.11)

(58) Field of Classification Search
CPC .. H04N 19/176; H04N 19/186; H04N 19/119; H04N 19/126; H04N 19/70
See application file for complete search history.

(56) References Cited

OTHER PUBLICATIONS

Rui Zhang et al, Accurate Parameter Estimation and Efficient Fade Detection for Weighted Prediciton in H.264 Video Compression, 2008 IEEE, 4 pages.

Document: JVET-N0646-v3, Chun-Chi Chen et al, Non-CE4/8: Combination of Blending-off Switch (JVET-00645) and Simplified Motion Storage (JVET-00411) for TPM Mode, Joint Video Experts Team (JVET) of ITU-T SG 16 WP 3 and ISO/IEC JTC 1/SC 29/WG 11, 15th Meeting: Gothenburg, SE, Jul. 3-17, 2019, 11 pages.

Jill M. Boyce, Weighted Prediction in the H.264/MPEG AVC Video Coding Standard, 2004 IEEE, 4 pages.

Athanasios Leontaris et al, Weighted prediction methods for improved motion compensation, 2009 16th IEEE International Conference on Image Processing (ICIP), 4 pages.

Document: JVET-L0124-v2, Ru-Ling Liao et al, CE10.3.1.b: Triangular prediction unit mode, Joint Video Exploration Team (JVET) of ITU-T SG 16 WP 3 and ISO/IEC JTC 1/SC 29/WG 11, 12th Meeting: Macao, CN, Oct. 3-12, 2018, 8 pages.

Document: JVET-O0244-v1, Vadim Seregin et al, AHG17: On zero delta POC in reference picture structure, Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

Document: JVET- O0489-v4, Semih Esenlik et al, Non-CE4: Geometrical partitioning for inter blocks, Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

ITU-T H.264(Jun. 2019), Series H: Audiovisual and Multimedia Systems, Infrastructure of audiovisual services-Coding of moving video, Advanced video coding for generic audiovisual services, total 836 pages.

ITU-T H.265(Jun. 2019), Series H: Audiovisual and Multimedia Systems, Infrastructure of audiovisual services—Coding of moving video, High efficiency video coding, total 696 pages.

Filippov, et al. (Huawei), "On TPM and GEO merge modes in presence of weighted prediction," Joint Video Experts Team (JVET) of ITU-T SG 16 WP 3 and ISO/IEC JTC 1/SC 29/WG 11, 17th Meeting, Brussels, BE; Jan. 7-17, 2020, Document: JVET-Q0266-v1; Retrieved from the Internet: URL: http://phenix.int-evry.fr/jvet/doc end_user/documents/17_Brussels/wg11/JVET-00266-v4.zip JVET-00266-v4.docx[retrieved on Jan. 14, 2020]; 29 total pages.

Chen, et al., (Qualcomm), "Non-CE4/8: Blending-off Switch for TPM Mode," Joint Video Experts Team (JVET) of ITU-T SG 16 WP 3 and ISO/IEC JTC 1/SC 29/WG 11, 15th Meeting, Gothenburg, SE, Jul. 3-17, 2019, Document No. JVET-N0645-v2; 5 total pages.

Alexey Filippov et al., "On TPM and GEO merge modes in presence of weighted prediction", Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q0266-v1; 29 total pages.

Benjamin Bross et al., "Versatile Video Coding (Draft 6)", Joint Video Experts Team (JVET) of Itu-T Sg 16 WP 3 and Iso/Iec Jtc 1/SC 29/WG 11,15th Meeting: Gothenburg, SE, Jul. 3 - 12, 2019, JVET-O2001-vE; 455 total pages.

\* cited by examiner

METHOD AND APPARATUS OF HARMONIZING TRIANGULAR MERGE MODE WITH WEIGHTED PREDICTION

CROSS-REFERENCE TO RELATED APPLICATIONS

This application is a continuation of International Application No. PCT/CN2020/120027, filed on Oct. 9, 2020, which claims priority to U.S. Provisional Application No. 62/913,219, filed on Oct. 10, 2019, and U.S. Provisional Application No. 62/913,711, filed on Oct. 10, 2019. All of the aforementioned patent applications are hereby incorporated by reference in their entireties.

TECHNICAL FIELD

Embodiments of the present application (disclosure) generally relate to the field of moving picture processing and more particularly to non-rectangular partitioning modes when used in combination with weighted prediction for coding fades.

BACKGROUND

Video coding (e.g., video encoding and decoding) is used in a wide range of digital video applications, such as in broadcasting digital television (TV), video transmission over internet (e.g., Video-over-IP) and mobile networks, real-time conversational applications such as video chat, video conferencing, digital versatile disc (DVD) and Blu-ray discs, video content acquisition and editing systems, and camcorders for security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

The embodiments provide methods for encoding and decoding a video sequence with weighted prediction parameters that are combined from fade weighting parameters and blending weighting parameters. The values of the fade weighting parameters are determined by a reference index value and a reference picture list, while blending the weighting parameters are determined by a position of a predicted sample in a predicted block.

The embodiments of this disclosure are defined by the features of the independent claims, and further optional advantageous implementations of the embodiments are detailed in the features of the dependent claims.

According to an aspect of the present disclosure an inter prediction method is provided, comprising determining whether all reference pictures in a preset reference picture set of a current slice are disabled for slice-level weighted prediction of the current slice, determining that non-rectangular prediction units for the current slice are disabled for the slice-level weighted prediction, when all the reference pictures are determined to be disabled, and predicting the current slice in accordance with the determination result.

This may provide an advantage for efficiently determining whether or not non-rectangular prediction units for the current slice are disabled. Also, a repeated transmission of reference pictures may be avoided, and hence reduces the signaling overhead. Additionally, the disabling enables the reduction of artefacts in the inter-prediction.

The non-rectangular prediction unit may be also referred to as non-rectangular prediction partition. For brevity, the terms non-rectangular unit or non-rectangular partition may be used interchangeably. Examples of such kind of units or partitions are shown, for example, in FIGS. 7 and 8. FIG. 7 shows a partition into two triangular units, where the partition boundary goes from the bottom-left to the top-right corner. In FIG. 8, the boundary intersects with two edges, resulting in one triangular and one multi-edge partition (five edges). Alternatively, the intersection boundary may also intersect with one corner and one of the four edges. Also, the intersection boundary may have any direction (orientation) with respect to x-y pixel coordinate axes.

FIG. 11 shows a flowchart of the inter-prediction. The input of the flowchart is a current slice which may have a preset reference picture set. In step 1101, it is determined whether all reference pictures in the preset reference picture set are disabled for slice-level weighted prediction. If this is the case, i.e. the result of the determination is "YES", in step 1102 it is determined that non-rectangular prediction units for the current slice are disabled for the slice-level weighted prediction. This is followed in step 1103 for predicting the current slice. This means that the current slice is predicted without employing the slice-level weighted prediction. In turn, when the result of the determination in step 1101 is "NO", then the current slice is predicted in step 1104. This results in the current slice to be predicted employing the slice-level weighted prediction.

FIG. 16 shows a block diagram of inter-prediction module (e.g., inter-prediction circuit) 1600, implementing the method according to the flowchart of FIG. 11. The module 1600 includes determining unit (e.g., determining circuit) 1610 for reference picture dis-/enabling, determining unit (e.g., determining circuit) 1620 for non-rectangular prediction units dis-/enabling, and predictor unit (e.g., predictor circuit) 1630. The module 1600 takes as its input, a current slice. The determining unit 1610 then determines whether all reference pictures in the preset reference picture set are disabled for slice-level weighted prediction. The unit 1610 provides as an output, a determination result. The determination result may, for example, be "YES" or "NO". This result is input into the determining unit 1620. In the case that the result is "YES", i.e. all reference pictures are disabled, the unit 1620 determines that non-rectangular prediction units for the current slice are disabled for the slice-level weighted prediction. The predictor unit 1630 then predicts the current slice without employing the slice-level weighted prediction. When the determination result output by unit 1610 is "NO", the predictor unit 1630 predicts the current slice employing the slice-level weighted prediction.

According to an aspect of the present disclosure, the disabling of all the reference pictures is indicated by one or more flags.

This may provide an advantage of a simple signaling of the disabling of all the reference pictures. Hence, the signaling overhead by use of simple flag(s) is low.

According to an aspect of the present disclosure, the one or more flags include luma-weighted flags and/or a chroma-weighted flags.

This may provide an advantage of performing the flag-based signaling in a very flexible manner. This includes setting the flags for luma and chroma independently. Alternatively, the chroma-weighted flags may be derived from the luma-weighted flags.

According to an aspect of the present disclosure, the one or more luma weighted flags and the one or more chroma-weighted flags each refer to a list0 and a list1 of all the reference pictures. In these aspects, the list0 includes reference pictures of a first predictor $P_0$ of the current slice and the list1 includes reference pictures of a second predictor $P_1$ of the current slice.

According to an aspect of the present disclosure, the disabling is indicated when all the following conditions are true: the luma-weighted flags of the list0 are 0; the luma weighted flags of the list1 are 0; the chroma weighted flags of the list0 are 0; and the chroma weighted flags of the list1 are 0.

This may provide an advantage of linking the luma- and/or chroma-weighted flags with the reference picture list and indicating the disabling with high flexibility. This includes formulating condition(s) for said disabling indication by combining settings of luma flags with setting of chroma flags. The value of each of the luma-weighted flags and chroma-weighted flags being 0 (i.e. zero) is an example for the value each of the flag may have. Said value is not limited to the value of zero, but may take any other value (e.g., positive and/or negative integer and/or real valued) suitable for the disabling indication. It may take also a Boolean value "true" or "false", which are often associated with values of "1" or "0" (or vice versa, although this is less common).

According to an aspect of the present disclosure, determining the slice-level weighted prediction is enabled in the event that any one of all the reference pictures is enabled for the weighted prediction.

This may provide an advantage of efficient determining of enabling the weighted prediction based on enabled reference pictures.

According to an aspect of the present disclosure, the slice-level weighted prediction is a triangle prediction mode (TPM) or a geometric prediction mode (GEO).

In TPM, triangle partitions, such as shown in FIG. 7, are used for the slice-level weighted prediction. In GEO, the partitions may comprise one triangular unit and a multi-edge unit having, for example, five edges as shown in FIG. 8.

According to an aspect of the present disclosure, an inter prediction method is provided, comprising parsing an indicator from a bitstream corresponding to a current slice and determining whether slice-level weighted prediction for non-rectangular prediction units of the current slice is enabled for the current slice according to a value of the indicator; and predicting the current slice in accordance with the determination result.

This may provide an advantage of a quick determination whether a current slice is enabled for slice-level weighted prediction from a simple indictor parsing of a bitstream. This means that said indicator does not need to be derived during decoding. Hence, the decoding processing becomes more efficient.

FIG. 12 shows a flowchart of the inter-prediction. The input of the flowchart is a bitstream of a current slice. In step 1201, an indicator is parsed from the bitstream. The indicator may have a value, upon which it is determined in step 1202 whether a slice-level weighted prediction for non-rectangular prediction units of the current slice is enabled. Dependent on the determination result in step 1202, the current slice is predicted in accordance with the determination result in step 1203.

FIG. 17 shows a block diagram of inter-prediction module (e.g., inter-prediction circuit) 1700, implementing the method according to the flowchart of FIG. 12. The module 1700 includes parsing unit (e.g., parsing circuit) 1710, determining unit (e.g., determining circuit) 1720 for non-rectangular prediction units dis-/enabling, and predictor unit (e.g., predictor circuit) 1730. The module 1700 takes a bitstream as an input. The parsing unit then parses the bitstream for an indicator which may have a value. Based on the value, the unit 1720 determines whether a slice-level weighted prediction for non-rectangular prediction units of the current slice is enabled. Depending on the determination result of the unit 1720, the predictor unit 1730 predicts the current slice.

According to an aspect of the present disclosure, the indicator is a flag.

This may provide an advantage of a simple indication. Further, said flag may be a slice_weighted_pred flag, for example. Specifically, said flag may be any of pps_weighted_pred_flag and/or a pps_weighted_bipred_flag. Therein, the term labels "_pred_" and "_bipred_" refer to normal prediction and bi-prediction, respectively. The slice_weighted_pred_flag may also referred to as weightedPredFlag.

According to an aspect of the present disclosure, the flag is based on a type of the current slice.

This may provide an advantage of performing the bitstream parsing on the basis of the type of the slice. This make the parsing more flexible.

The type may be a "P" slice or a "B"-slice. When the type is "P", the slice_weighted_pred_flag may be set equal to pps_weighted_pred_flag. When the type is "B", the slice_weighted_pred_flag may be set equal to pps_weighted_bipred_flag.

According to an aspect of the present disclosure, the slice-level weighted prediction is determined to be enabled when the value is a first value.

According to an aspect of the present disclosure, the slice-level weighted prediction is disabled when the value is a second value different from the first value.

This may provide an advantage of determining the enabling and disabling of the slice-level weighted prediction in a simple manner. This makes said determination more efficient.

According to an aspect of the present disclosure, the slice-level weighted prediction is a non-rectangular prediction mode.

This may provide an advantage of extending the prediction mode to non-rectangular prediction modes. This means that predictions may be performed for those partitions that may not follow the common squared and/or rectangular shapes. Rather, predictions may be performed also for triangular shapes or mixed triangular and multi-edged shapes. This increases the flexibility of the prediction.

According to an aspect of the present disclosure the non-rectangular prediction mode is a TPM, or a GEO.

According to an aspect of the present disclosure, an inter prediction method is provided, comprising determining whether a current block is a sub-block of a coding unit (CU), disabling non-rectangular prediction mode for the current block when the current block is determined being a rectangular sub-block of the CU, and predicting the current block in accordance with the determination result.

Therein, the term CU refers to a unit in general, which may be further split into (sub-) blocks having different shapes. Such shapes may include square, rectangle, triangle, and/or multi-edge (polygon including regular or irregular ones).

This may provide an advantage of a sub-block-based determining of whether or not a non-rectangular prediction mode is disabled. In particular, the determination is performed by coupling the presence of a sub-block with its shape, which may be a common rectangle. This extends the prediction to non-rectangular sub-blocks.

FIG. 13 shows a flowchart of the inter-prediction. The input of the flowchart is a current block of a CU. In step 1301, it is determined whether the current block is a sub-block of the CU. If the result of the determination is "YES" in step 1301, the non-rectangular prediction mode for the current block is disabled in step 1302, when the current block is a rectangular sub-block of the CU. This is followed by predicting the current slice in step 1303. This means that the current slice is predicted without employing a non-rectangular prediction modes, such as TMP or GEO, for example. If the result of the determination in step 1301 is "NO", the current slice is predicted in step 1304. This means that the current slice may be predicted employing a non-rectangular prediction modes.

FIG. 18 shows a block diagram of inter-prediction module (e.g., inter-prediction circuit) 1800, implementing the method according to the flowchart of FIG. 13. The module 1800 includes determining unit (e.g., determining circuit) 1810 of sub-block, a disabling unit (e.g., disabling circuit) 1820 for non-rectangular prediction mode, and a predictor unit (e.g., predictor circuit) 1730. The module 1800 takes a current block of a CU as an input. The determining unit 1810 then determines whether the current block is a sub-block of the CU. The determination result may be, for example, "YES" or "NO". The result is provided as an input to the unit 1820. When the result is "YES", the unit 1820 determines that the non-rectangular prediction mode for the current block is disabled when the current block is a rectangular sub-block of the CU. The predictor unit 1830 then predicts the current slice without employing a non-rectangular prediction mode. In turn, when the result is "NO", the unit 1830 predicts the current slice employing a non-rectangular prediction mode, which may be GEO or TMP, for example.

According to an aspect of the present disclosure, weighted factors of reference pictures of the current block are not carried by a bitstream.

This may provide an advantage of reducing the signaling, and hence making the inter-prediction more efficient.

According to an aspect of the present disclosure, the non-rectangular prediction mode is a TPM or a GEO.

According to an aspect of the present disclosure, an inter prediction method is provided, comprising determining whether weighing factors of reference pictures of a current block are carried by a bitstream when the current block is processed by a sub-block based prediction mode for non-rectangular prediction units of the current block and obtaining a prediction value of the current block according to blending weighted parameters when the weighing factors are determined not being carried by the bitstream.

This may provide an advantage of a quick determination whether or not prediction is to be performed with weighing factors already carried by the bitstream or with blending parameters. This means that normal prediction, such as bi-prediction, may still be performed employing a weighting scheme by use of blending weighted parameters.

FIG. 14 shows a flowchart of the inter-prediction. The input of the flowchart is a current block. The current block may be transmitted by a bitstream. In step 1401, it is determined whether weighing factors of reference pictures of the current block are carried by the bitstream, when the current block is processed by a sub-block based prediction mode for non-rectangular prediction units. If this is not the case, i.e. the result of the determination is "NO", in step 1402 a prediction value of the current block is obtained according to blending weighted parameters.

FIG. 19 shows a block diagram of inter-prediction module (e.g., inter-prediction circuit) 1900, implementing the method according to the flowchart of FIG. 14. The module 1900 includes determining unit (e.g., determining circuit) 1910 of weighing factors and obtaining unit (e.g., obtaining circuit) 1920 of a prediction value. The module 1900 takes as an input, a current block which may be carried by a bitstream. The unit 1910 then determines whether weighing factors of reference pictures of the current block are carried by the bitstream in case the current block is processed by a sub-block based prediction mode for non-rectangular prediction units. The result of this determination is provided as input to the obtaining unit. When the result is "NO", the unit 1920 obtains a prediction value of the current block according to blending weighted parameters.

According to an aspect of the present disclosure, the method according to the previous aspect further comprises obtaining the prediction value of the current block according to the weighing factors when the weighing factors are determined being carried by the bitstream.

This may provide an advantage of performing weighted prediction with weighing factors. This enables performing the prediction of the current block in a more flexible manner, since weighing factors are per se not limited in their values. Thus, the prediction may be performed more accurately.

According to an aspect of the present disclosure, the sub-block-based prediction mode is a non-rectangular prediction mode.

According to an aspect of the present disclosure, the non-rectangular prediction mode comprises a TPM or a GEO.

According to an aspect of the present disclosure, an apparatus for inter-prediction is provided, comprising a processor and a memory configured to be coupled to the processor and the processor is further configured to implement any one of the methods according to the previous aspects of the present disclosure.

This may provide an advantage of performing inter-prediction by said apparatus by exploiting any of the above-mentioned advantages of said methods, each being implemented by the processor.

FIG. 15 shows an apparatus 1500 for inter-prediction. The apparatus 1500 (also referred to as module) includes a processor 1510 and a memory 1520. Processor and memory are connected to each other, so as to communicate for exchange of instructions and/or data. For example, the memory may store a program corresponding to instructions for executing any of the steps of the previous methods. Said execution of the method steps is performed by the processor.

According to an aspect of the present disclosure, a bitstream corresponding to a current block is provided, comprising a first indicator indicating a CU comprising the current block being processed with a sub-block based prediction mode for non-rectangular prediction units of the current block and the bitstream is forbidden to carry a second indicator indicating a weighting factor.

This may provide an advantage of decoding the bitstream more efficiently.

According to an aspect of the present disclosure, the sub-block-based prediction mode is a non-rectangular prediction mode.

According to an aspect of the present disclosure, the non-rectangular prediction mode comprises a TPM or a GEO.

According to an aspect of the present disclosure, a prediction mode of the current block is the triangle prediction mode when the first indicator is a first value.

For example, the first indicator may be MergeTriangleFlag.

According to an aspect of the present disclosure, the first indicator is the first value when all the following conditions are true: sps_triangle_enabled_flag is equal to 1; slice_type is equal to B; general_merge_flag[x0][y0] is equal to 1; MaxNumTriangleMergeCand is greater than or equal to 2; cbWidth*cbHeight is greater than or equal to 64; regular_merge_flag[x0][y0] is equal to 0; merge_subblock_flag[x0][y0] is equal to 0; ciip_flag[x0][y0] is equal to 0; and weightedPredFlag is equal to 0; wherein B indicates bi-partitioning of the current block, cbWidth and cbHeight are the width and height of the current block, and [x0][y0] is an x- and y-position of a luma sample at the top-left of the current block.

This may provide an advantage of making the first indicator being the first value dependent on a variety of different conditions, including, for example, a criteria on the size of the current block, slice type, triangle enabled, etc. This makes the signaling via the bitstream more efficient, while accounting for many condition requirements by a single value of the first indicator.

According to an aspect of the present disclosure, when the first indicator is the first value, the bit stream further carries a third indicator, indicating a split direction of the current block.

This may provide an advantage of also signaling the split direction of the current block in the bitstream. However, said signaling may be only performed if the first indicator is the first value. Thus, the bitstream contains only signaling information that is really needed for performing the non-rectangular prediction, and hence may reduce the signaling overhead.

The third indicator may be a flag merge_triangle_split_dir.

According to an aspect of the present disclosure, the bitstream further carries the second indicator when the first indicator is a second value.

This may provide an advantage of including a second indicator, which indicates a weighting factor, into the bitstream.

The embodiments provide for an efficient encoding and/or decoding using signal-related information in slice headers only for slices which allow or enable bidirectional inter-prediction, e.g., in bidirectional (B) prediction slices, also called B-slices.

According to an aspect of the present disclosure an apparatus is provided. The apparatus comprises a determining unit (e.g., determining circuit) configured to determine whether all reference pictures in a preset reference picture set of a current slice are disabled for slice-level weighted prediction of the current slice, determine that non-rectangular prediction units for the current slice are disabled for the slice-level weighted prediction, when all the reference pictures are determined to be disabled; and a predicting unit (e.g., predicting circuit) configured to predict the current slice in accordance with the determination result.

According to an aspect of the present disclosure an apparatus is provided. The apparatus comprises a parsing unit (e.g., parsing circuit) configured to parse an indicator from a bitstream corresponding to a current slice, a determining unit (e.g., determining circuit) configured to determine whether slice-level weighted prediction for non-rectangular prediction units of the current slice is enabled for the current slice according to a value of the indicator, and a predicting unit (e.g., predicting circuit) configured to predict the current slice in accordance with the determination result.

According to an aspect of the present disclosure an apparatus is provided. The apparatus comprises a determining unit (e.g., determining circuit) configured to determine whether a current block is a sub-block of a CU and disable non-rectangular prediction mode for the current block when the current block is determined being a rectangular sub-block of the coding unit, and a predicting unit (e.g., predicting circuit) configured to predict the current slice in accordance with the determination result.

According to an aspect of the present disclosure an apparatus is provided. The apparatus comprises a determining unit (e.g., determining circuit) configured to determine whether weighing factors of reference pictures of a current block are carried by a bitstream when the current block is processed by a sub-block based prediction mode for non-rectangular prediction units of the current block and a predicting unit (e.g., predicting circuit) configured to obtain a prediction value of the current block according to blending weighted parameters when the weighing factors are determined not being carried by the bitstream.

The method aspects of the disclosure can be performed by the apparatus aspects of the disclosure. Further features and implementation forms of the method aspects of the disclosure correspond to the features and implementation forms of apparatus aspects of the disclosure.

According to an aspect of the present disclosure an apparatus is provided. The apparatus comprises processing circuitry for carrying out the method according to the method aspects of the disclosure.

According to an aspect of the present disclosure an apparatus is provided. The apparatus comprises a processor and a memory. The memory stores instructions that cause the processor to perform the method according to the method aspects.

According to an aspect of the present disclosure, a computer-readable storage medium having stored thereon instructions that when executed cause one or more processors configured to code video data is proposed. The instructions cause the one or more processors to perform a method according to the method aspects of the disclosure.

According to an aspect of the present disclosure, a computer program comprising program code for performing the method according to the method aspects of the disclosure when executed on a computer.

The foregoing and other objects are achieved by the subject matter of the independent claims. Further optional implementation forms are apparent from the dependent claims, the description, and the figures.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of this disclosure are described in more detail with reference to the attached figures and drawings, in which.

Figure 1A:
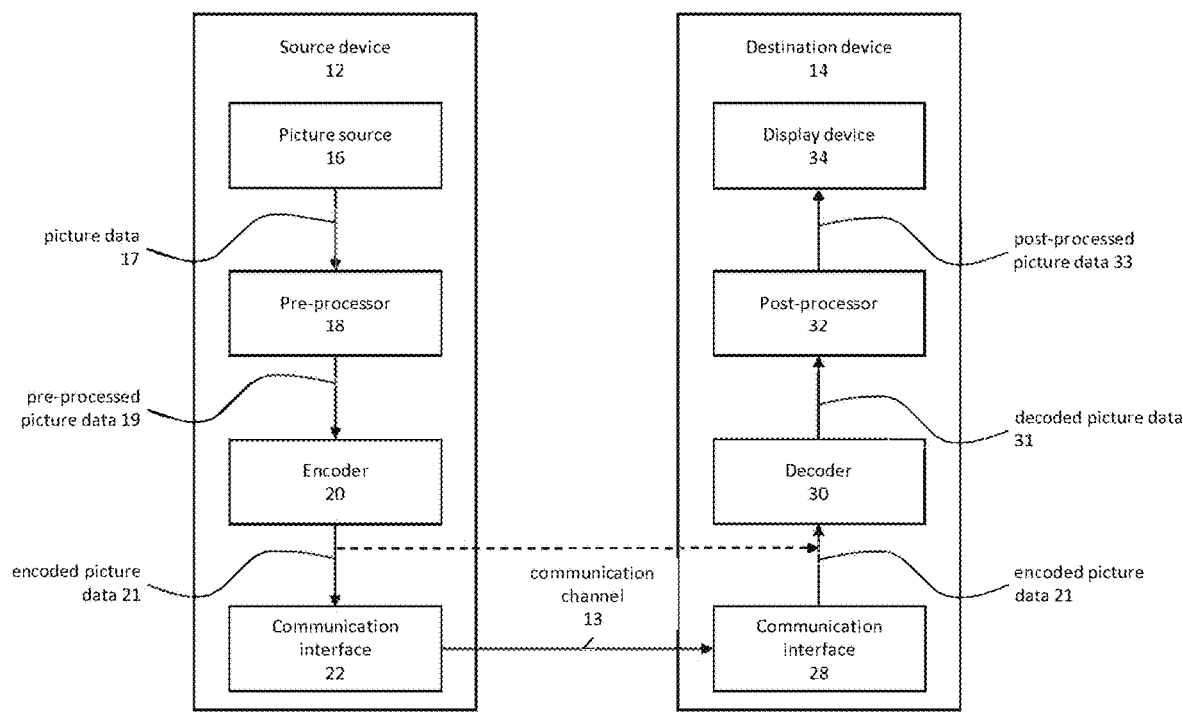
FIG. 1A is a block diagram showing an example of a video coding system configured to implement embodiments of this disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of this disclosure or specific aspects in which embodiments of the present disclosure may be used. It is understood that embodiments of this disclosure may be used in other aspects and comprise structural or logical changes not depicted in the figures. The following detailed description, therefore, is not to be taken in a limiting sense.

For instance, it is understood that a disclosure in connection with a described method may also hold true for a corresponding device or system configured to perform the method and vice versa. For example, if one or a plurality of method steps are described, a corresponding device may include one or a plurality of units (e.g., plurality of circuits, plurality of modules), e.g., functional units (e.g., functional circuits, functional modules), to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e. optionally, comprise a picture source 16, a pre-processor (or pre-processing unit, pre-processing circuit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32, post-processing circuit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro light emitting diode (LED) displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
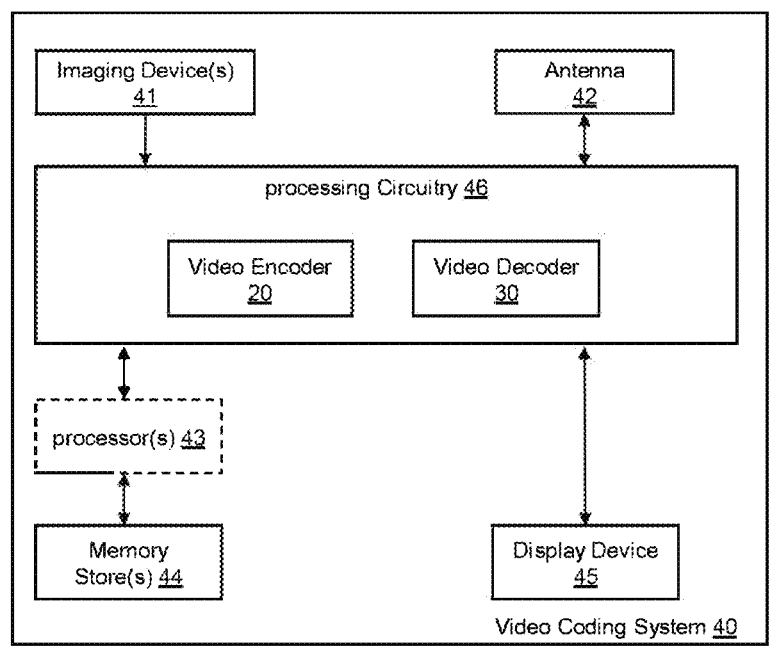
FIG. 1B is a block diagram showing another example of a video coding system configured to implement embodiments of this disclosure.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of this disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of this disclosure are not limited to HEVC or VVC.

Encoder and Encoding Method

Figure 2:
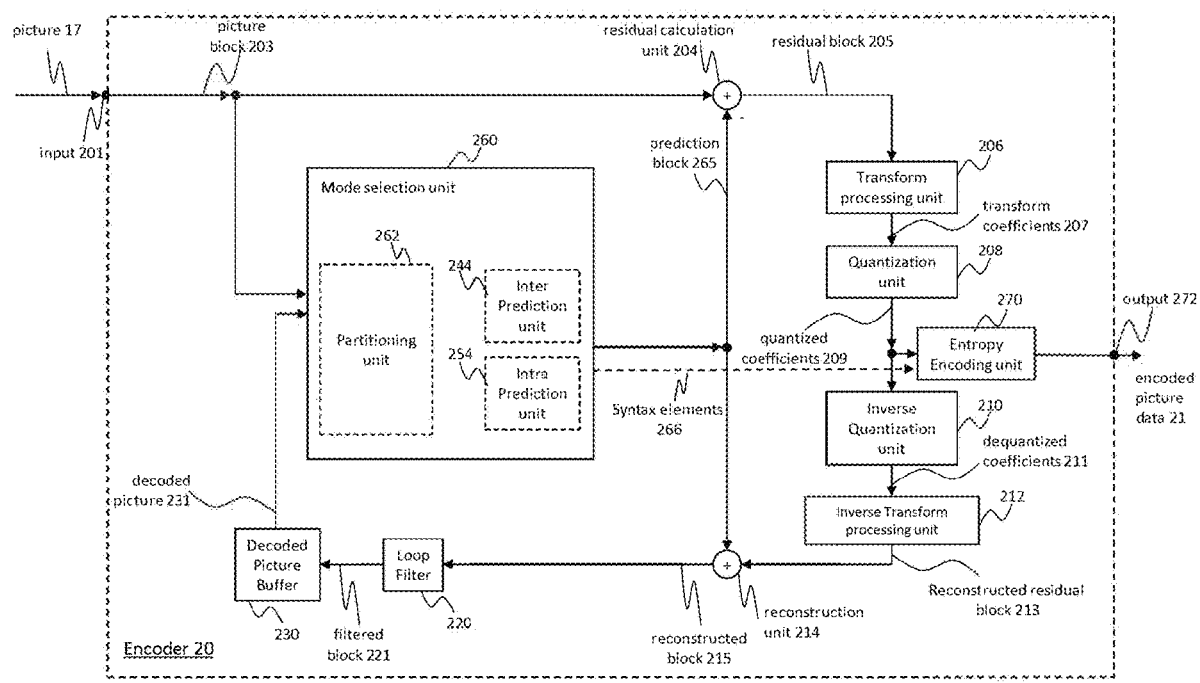
FIG. 2 is a block diagram showing an example of a video encoder configured to implement embodiments of this disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204 (e.g., a residual calculation circuit), a transform processing unit 206 (e.g., a transform processing circuit), a quantization unit 208 (e.g., a quantization circuit), an inverse quantization unit 210 (e.g., an inverse quantization circuit), and inverse transform processing unit 212 (e.g., an inverse transform processing circuit), a reconstruction unit 214 (e.g., a reconstruction circuit), a loop filter unit 220 (e.g., a loop filter circuit), a decoded picture buffer (DPB) 230, a mode selection unit 260 (e.g., a mode selection circuit), an entropy encoding unit 270 (e.g., an entropy encoding circuit), and an output 272 (or output interface 272). The mode selection unit 260 may include an inter prediction unit 244 (e.g., an inter prediction circuit), an intra prediction unit 254 (e.g., an intra prediction circuit), and a partitioning unit 262 (e.g., a partitioning circuit). Inter prediction unit 244 may include a motion estimation unit (e.g., a motion estimation circuit) and a motion compensation unit (e.g., a motion compensation circuit) (not shown). A video encoder 20 as shown in FIG. 2 may also be referred to as hybrid video encoder or a video encoder according to a hybrid video codec.

Figure 3:
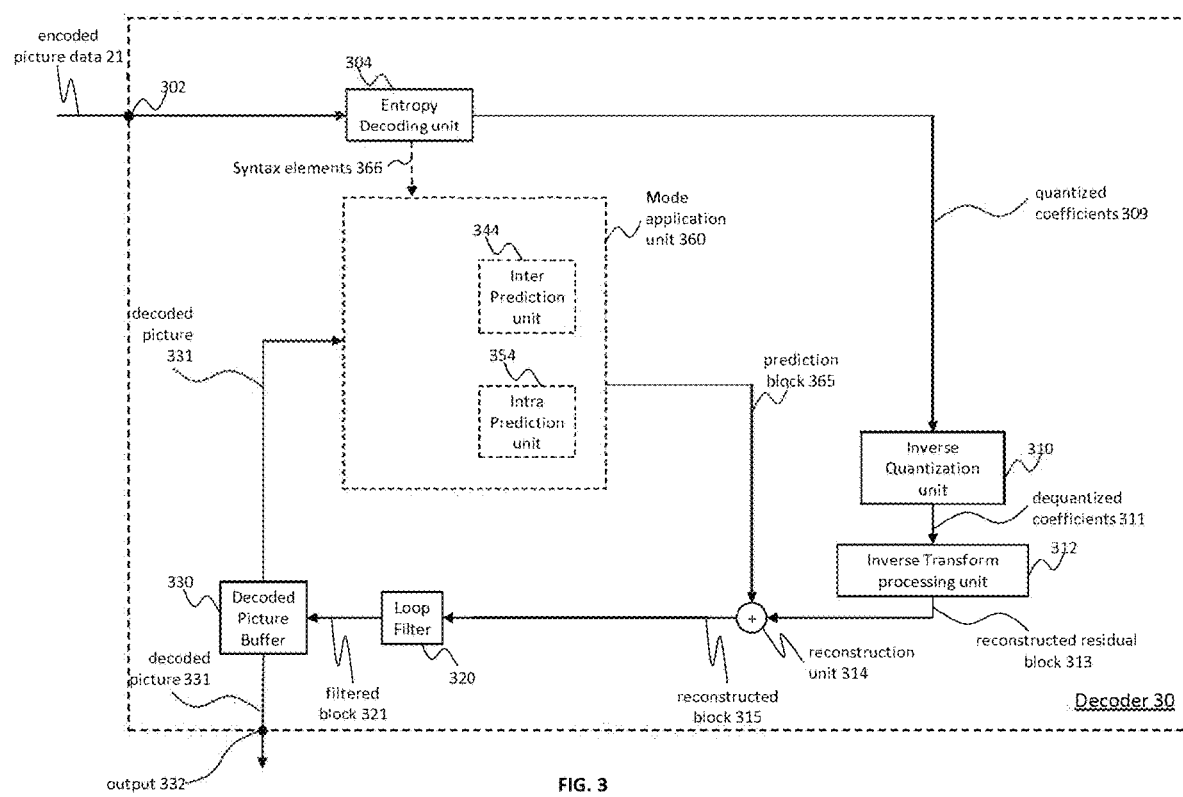
FIG. 3 is a block diagram showing an example structure of a video decoder configured to implement embodiments of this disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (e.g., picture portioning circuit) (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (e.g., coding tree circuits) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks. The abbreviation AVC stands for Advanced Video Coding.

In further embodiments, the video encoder may be configured to directly receive a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g., the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g., CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by the inverse transform processing unit 212 (and the corresponding inverse transform, e.g., by the inverse transform processing unit 312 at video decoder 30) and corresponding scaling factors for the forward transform, e.g., by the transform processing unit 206, at an encoder 20 may be specified accordingly.

Embodiments of the video encoder 20 (respectively, the transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by the inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively, the quantization unit 208) may be configured to output QPs, e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e. reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively, the loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The DPB 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises the partitioning unit 262, the inter-prediction unit 244 and the intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

The mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for the mode selection unit 260), which provide the best match or in other words the minimum residual (minimum residual meaning better compression for transmission or storage), or a minimum signaling overhead (minimum signaling overhead meaning better compression for transmission or storage), or which considers both or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by the partitioning unit 260) and prediction processing (by the inter-prediction unit 244 and the intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU) (e.g., coding circuit), prediction unit (PU) (e.g., prediction circuit), and transform unit (TU) (e.g., transform circuit) and/or to the corresponding blocks, e.g., a coding tree block (CTB), a coding block (CB), a transform block (TB) or prediction block (PB).

For example, a CTU may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a CTB may be an N×N block of samples for some value of N such that the division of a component into CTBs is a partitioning. A CU may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a CB may be an M×N block of samples for some values of M and N such that the division of a CTB into coding blocks is a partitioning.

In embodiments, e.g., according to HEVC, a CTU may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called CUs, and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g., pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. For example, a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, a mode application unit 360, an inter prediction unit 344 and an intra prediction unit 354. The inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the DPB 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive QP (or in general information related to the inverse quantization) and quantized coefficients from the encoded picture data 21 (e.g., by parsing and/or decoding, e.g., by the entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a SAO filter or one or more other filters, e.g., a bilateral filter, an ALF, a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, the inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

The mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g., CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, advanced temporal motion vector prediction in video coding (ATMVP) modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: Remove the Overflow MSB (Most Significant Bit) by Flowing Operations:

$$ux=(mvx+2^{bitDepth})\%2^{bitDepth} \quad (1)$$

$$mvx=(ux>=2^{bitDepth-1})?(ux-2^{bitDepth}):ux \quad (2)$$

$$uy=(mvy+2^{bitDepth})\%2^{bitDepth} \quad (3)$$

$$mvy=(uy>=2^{bitDepth-1})?(uy-2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111, 1111, 1111, 1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\%2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: Remove the Overflow MSB by Clipping the Value $$vx=Clip3(-2^{bitDepth-1},2^{bitDepth-1}-1,vx)$$

$$vy=Clip3(-2^{bitDepth-1},2^{bitDepth-1}-1,vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$i.Clip3(x, y, z) = \begin{cases} x & : z < x \\ y & : z > y \\ z & : \text{otherwise} \end{cases}$$

Figure 4:
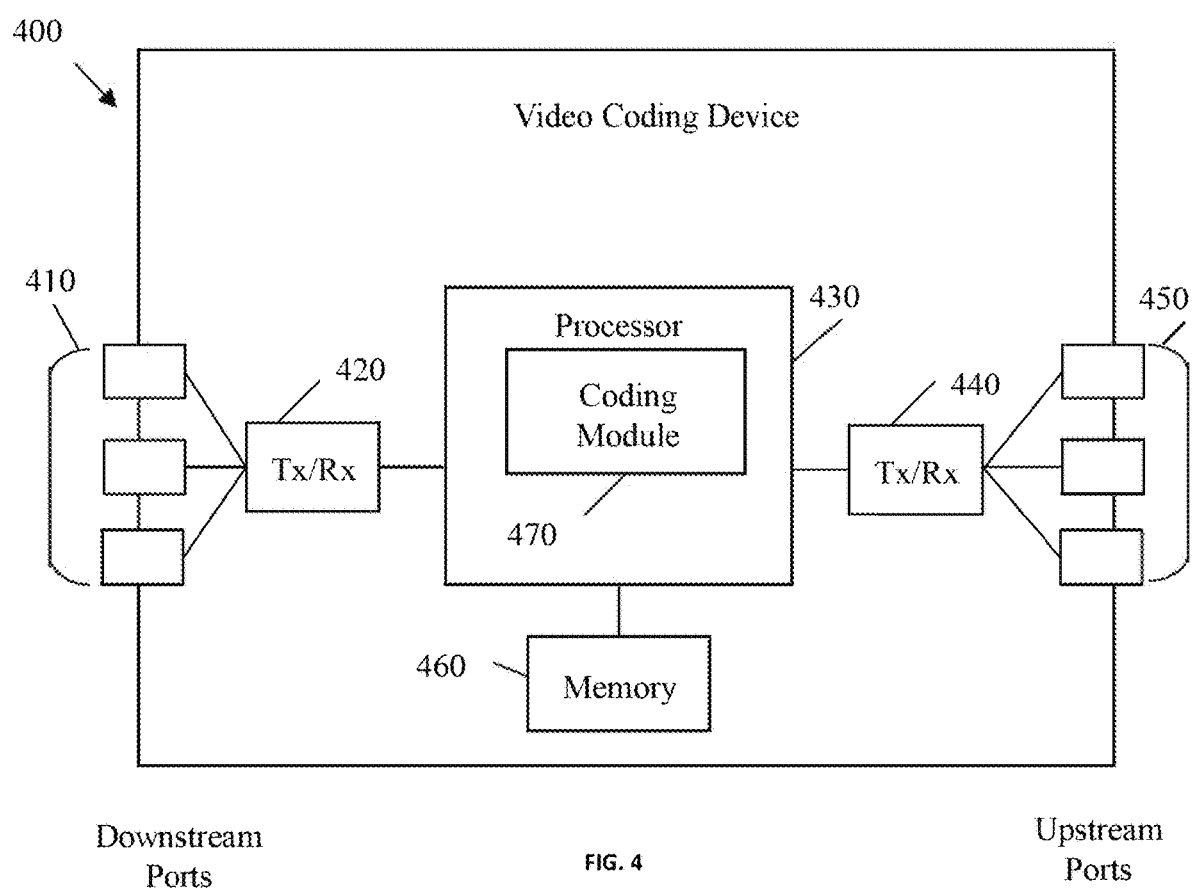
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit (e.g., logic circuit), or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
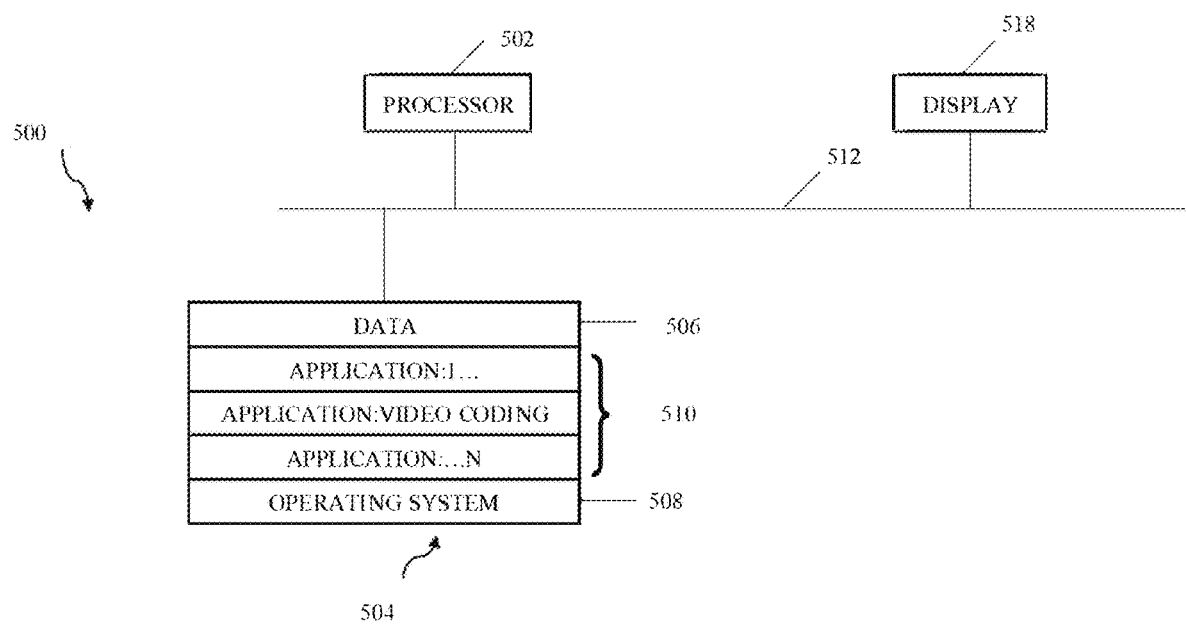
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

As mentioned in paper J. M. Boyce "Weighted prediction in the H.264/MPEG AVC video coding standard", IEEE International Symposium on Circuits and Systems, May 2004, Canada, pp. 789-792, Weighted Prediction (WP) is a tool, which is particularly useful for coding fades. The WP tool has been adopted in the H.264 video coding standard's Main and Extended profiles to improve coding efficiency by applying a multiplicative weighting factor and an additive offset to the motion compensated prediction to form a weighted prediction. In explicit mode, a weighting factor and offset may be coded in the slice header for each allowable reference picture index. In implicit mode, the weighting factors are not coded but are derived based on the relative picture order count (POC) distances of the two reference pictures. Experimental results are provided which measure the coding efficiency improvement using WP. When coding fade-to-black sequences, bitrate reductions of up to 67% were achieved.

When applied to a single prediction, as in P pictures, WP is similar to leaky prediction, which has been previously proposed for error resiliency. Leaky prediction becomes a special case of WP, with the scaling factor limited to the range $0 \le \alpha \le 1$. H.264 WP allows negative scaling factors, and scaling factors greater than one. A weighting-factor is applied pixel-by-pixel using a coded label field, for efficient compression of covered and uncovered regions. A key difference of H.264's WP tool from previous proposals involving weighted prediction for compression efficiency is the association of the reference picture index with the weighting factor parameters, which allows for efficient signaling of these parameters in a multiple reference picture environment. As written in paper R. Zhang and G. Cote "accurate parameter estimation and efficient fade detection for weighted prediction in H.264 video compression", 15th IEEE International Conference on Image Processing, October 2008, San Diego, California, US, pp. 2836-2839, the procedure of applying WP in a real-time encoding system can be formalized as a sequence of steps shown in FIG. 6. First, some statistics 611 are generated through video analysis 610. The statistics 611 within a small window, from several previous pictures till the current picture, are then used to detect fade. Each picture is assigned a state value 631 indicating if the picture is in the state of NORMAL or in the state of FADE. Such state values are saved for each picture. When encoding a picture, if there is a FADE state in either the current picture or one of its reference pictures, the WP will be used for this current-reference pair, and statistics of current picture and the corresponding reference picture are processed at step 650 to estimate the WP parameters. These parameters are then passed on to the encoding engine 660. Otherwise, the normal encoding is done.

As mentioned in paper A. Leontaris and A. M. Tourapis "Weighted prediction methods for improved motion compensation", 16th IEEE International Conference on Image Processing (ICIP), November 2009, Cairo, Egypt, pp. 1029-1032, a macroblock in H.264 is divided into macroblock partitions. For each macroblock partition, a reference is selected from each one of the available reference lists (frequently denoted in specifications as RefPicList), list 0 for P or B-coded slices or reference list 1 for B-coded slices. The references used may be different for each partition. Using these references, a prediction block is generated for each list, i.e. P for single list prediction and $P_0$ and $P_1$ for bi-prediction, using motion information with, optionally, subpixel precision. The prediction blocks may be further processed depending on the availability of weighted prediction for the current slice. For P slices, the WP parameters are transmitted at the slice header. For B slices, there are two options. In the explicit WP, the parameters are transmitted in the slice header, and in the implicit WP the parameters are derived based on the POC number that is signaled in the slice header. In this paper we will only focus on explicit WP and how this method could be used to improve motion compensation performance. Note that in HEVC and VVC, PB is used similarly to macroblock partition in AVC.

For P slices or single-list explicit WP in B slices, the prediction block is drawn from a single reference. Let p denote a sample value in prediction block P. If weighted prediction is not used, then the final inter prediction sample is f=p. Otherwise the predicted sample is:

$$f = \begin{cases} ((p \times w_x + 2^{\log WD-1}) \gg \log WD) + o, & \log WD \geq 1 \\ (p \times w_x + o_x), & \text{otherwise} \end{cases},$$

Terms $w_x$ and $o_x$ are the WP gain and offset parameters for reference list x. Term log WD is transmitted in the bit stream and controls the mathematical precision of the weighted prediction process. For log WD≥1, the expression above rounds away from zero. Similarly, for bi-prediction, two prediction blocks, one for each reference list, are considered. Let $p_0$ and $p_1$ denote samples in each of the two prediction blocks $P_0$ and $P_1$. If weighted prediction is not used, prediction is performed as:

$f=(p_0+p_1+1)\gg 1.$

For weighted bi-prediction, prediction is performed as:

$f=((p_0\times w_0+p_1\times w_1+2^{\log WD})\gg(\log WD+1)) +((o_0+o_1+1)\gg 1)$ It is worth noting weighted prediction can compensate for illumination changes, such as a fade-in, fade-out, or a cross-fade.

On a high level in VVC, weighted prediction is signaled in a sequence parameter set (SPS), a picture parameter set (PPS), and a slice header. The use of SPS and PPS serve the design goal of bit rate efficiency, error resiliency, and providing systems layers interfaces. The SPS contains information which applies to all pictures in the same coded video sequence. The PPS contains information which applies to all slices in a picture, and hence all slices in a picture must refer to the same PPS. The slices in different pictures are also allowed to refer to the same PPS.

While the PPS may differ for separate pictures, it is common for many or all pictures in a coded video sequence to refer to the same PPS. Reusing parameter sets is bit rate efficient because it avoids the necessity to send shared information multiple times. It is also loss robust because it allows parameter set content to be carried by some more reliable external communication link or to be repeated frequently within the bitstream to ensure that it will not get lost. This ability to reuse the content of a picture parameter set in different pictures and to reuse the content of SPSs in different CVSs is what primarily distinguishes the concept of a "parameter set" from the "picture header" and "sequence header" syntax used in older standards established prior to AVC.

To identify for a given slice the active parameter set at each level of the parameter set type hierarchy, each slice header contains a PPS identifier which references a particular PPS. Within the PPS is an identifier that references a particular SPS. A parameter set is activated when the current coded slice to be decoded references that parameter set. All active parameter sets must be available to the decoder when they are first referenced. Parameter sets may be sent in-band or out-of-band, and may be sent repeatedly. Parameter sets may be received in any order. There are no parsing dependencies between parameter sets, e.g., a PPS may be parsed and its parameters stored without the need for referencing the information contained within the SPS to which it refers. These parameter set features provide improved error resiliency, by overcoming some network loss of parameter sets. Additionally, the use of parameter sets allows an individual slice to be decoded even if another slice in the same picture suffered network loss, compared to if a picture header containing the same information was present in a subset of the slices of a picture. The hierarchy of parameter sets can be exploited by systems interfaces, which may benefit from having sequence-level and bitstream-level information available in advance. All parameter sets contain extension flags, to enable backwards-compatible future extensions.

Sequence Parameter Set—SPS

The SPS contains parameters that apply to an entire coded video sequence, and do not change from picture to picture within a coded video sequence. All pictures in the same CVS must use the same SPS. The SPS contains an SPS identifier, and the remaining SPS parameters fit into the following categories. Some of the parameters provide key descriptions of the coded sequence, which can be useful for systems interfaces. Other parameters describe usage of coding tools, or provide coding tool parameters, which can improve bit rate efficiency Key parameters describing the characteristics of the coded sequence are included in the SPS. The profile, tier, and level indications specify conformance points, similar to the profile and level definitions in AVC. A profile defines a set of coding tools, a level imposes capability restrictions on maximum sample rate, picture size, and capabilities of the DPB, etc. HEVC introduces a tier indication, which in combination with level, imposes a maximum bit rate restriction. The coded picture height and width in luma samples are included in the SPS, as well as the conformance window cropping parameters to indicate the output region of the coded picture. Luma and chroma bit depth are also indicated, and their allowable values are constrained by profiles.

The SPS also contains parameters to enable or disable coding tools, or to set restrictions on coding tools. In some cases, a coding tool enable flag in the SPS allows a coded slice to avoid containing syntax elements related to the unused coding tool. Examples of tools with enable flags are asymmetric motion partitioning (AMP), SAO, and PCM coding. Restrictions on the coding tree block and transform unit sizes are also signaled.

The SPS also can optionally include coding tool parameters, which may also be sent at lower layers if per picture variation is used. These include scaling list data, which provides quantization matrices, and reference picture set (RPS) data.

In SPS, the following syntax elements are used for the signaling:

sps_weighted_pred_flag equal to 1 specifies that weighted prediction may be applied to P slices referring to the SPS. sps_weighted_pred_flag equal to 0 specifies that weighted prediction is not applied to P slices referring to the SPS;

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

Picture Parameter Set—PPS

The PPS contains parameters that may change for different pictures within the same coded video sequence. However, multiple pictures may refer to the same PPS, even those with different slice coding types (I, P, and B). Including these parameters within parameter sets rather than within the slice header can improve bit rate efficiency and provide error resiliency when the PPS is transmitted more reliably.

The PPS contains a PPS identifier, as well as an index to a reference SPS. The remaining parameters describe coding tools used in the slices which refer to the PPS. Coding tools are enabled or disabled, including dependent slices, sign data hiding, constrained intra prediction, weighted prediction, trans/quant bypass, tiles, and reference list modification. Coding tool parameters signaled in the PPS include the number of reference indices, initial QP, and chroma QP offsets. Coding tool parameters may also be signaled in a PPS, e.g., deblocking filter controls, tile configurations, and scaling list data.

For future extensibility, the PPS contains syntax elements indicating extensions to the slice segment header. A syntax element indicates a number of extra slice header bits, in the range of 0-7, to be included at the beginning of the slice header. In addition, a slice segment header extension flag in the PPS indicates the presence of additional bits at the end of the slice segment header.

In PPS, the following syntax elements are used for the signaling:
- pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0;
- pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

Slice Segment Header

The slice segment header, also simply referred as slice header, contains an index to a reference PPS. The slice segment header contains data identifying the slice segment, including a first slice segment in picture flag and a slice segment address. When dependent slices are used, a slice may be split into multiple slice segments. Some parameters are included only in the first slice segment of a slice, including the slice type (I, P, or B), picture output flag, and long term and short term RPS info.

The presence of some coding tool parameters are present in the slice segment header if the tools were enabled in the SPS or PPS, including enabling SAO separately for luma and chroma, enabling deblocking filter operation across slices, and an initial slice QP value. Deblocking filter parameters may either be present in the slice segment header or the PPS. If tiles or wavefronts are used, entry points are provided in the slice segment header. Optional extra slice segment header bits may be included at the beginning of the slice segment header, when indicated in the PPS. Their use is intended for future extensibility, to allow association of parameters with a backwards compatible base layer in a manner that is easily accessible by systems entities.

In slice header, weighted prediction parameters are signaled as pred_weight_table( ) structured as in Table 1 and containing the following elements:

luma_log 2_weight_denom is the base 2 logarithm of the denominator for all luma weighting factors. The value of luma_log 2_weight_denom shall be in the range of 0 to 7, inclusive.

delta_chroma_log 2_weight_denom is the difference of the base 2 logarithm of the denominator for all chroma weighting factors. When delta_chroma_log 2_weight_denom is not present, it is inferred to be equal to 0.

The variable ChromaLog2WeightDenom is derived to be equal to luma_log 2_weight_denom+delta_chroma_log 2_weight_denom and the value shall be in the range of 0 to 7, inclusive.

luma_weight_l0_flag[i] equal to 1 specifies that weighting factors for the luma component of list 0 prediction using RefPicList[0][i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

The variable LumaWeightL0[i] is derived to be equal to (1<<luma_log 2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log\ 2\_weight\_denom}$.

luma_offset_l0[i] is the additive offset applied to the luma prediction value for list 0 prediction using RefPicList[0][i]. The value of luma_offset_l0[i] shall be in the range of −128 to 127, inclusive. When luma_weight_l0_flag[i] is equal to 0, luma_offset_l0[i] is inferred to be equal to 0.

delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of −128 to 127, inclusive. When chroma_weight_l0_flag[i] is equal to 0, ChromaWeightL0[i][j] is inferred to be equal to $2^{ChromaLog2WeightDenom}$.

delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows:
a. ChromaOffsetL0[i][j]=Clip3(−128, 127, (128+delta_chroma_offset_l0[i][j]−((128*ChromaWeightL0[i][j])>>ChromaLog2WeightDenom)))

The value of delta_chroma_offset_l0[i][j] shall be in the range of −4*128 to 4*127, inclusive. When chroma_weight_l0_flag[i] is equal to 0, ChromaOffsetL0[i][j] is inferred to be equal to 0.

luma_weight_l1_flag[i], chroma_weight_l1_flag[i], delta_luma_weight_l1[i], luma_offset_l1[i], delta_chroma_weight_l1[i][j] and delta_chroma_offset_l1[i][j]

have the same semantics as luma_weight_l0_flag[i], chroma_weight_l0_flag[i], delta_luma_weight_l0[i], luma_offset_l0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma_weight_l0_flag[i], for i=0 . . . NumRefIdxActive[0]−1.

When slice_type is equal to B, the variable sumWeightL1Flags is derived to be equal to the sum of luma_weight_l1_flag[i]+2*chroma_weight_l1_flag[i], for i=0 . . . NumRefIdxActive[1]−1.

It is a requirement of bitstream conformance that, when slice_type is equal to P, sum WeightL0Flags shall be less than or equal to 24 and when slice_type is equal to B, the sum of sum WeightL0Flags and sum WeightL1Flags shall be less than or equal to 24.

TABLE 1

Weighted prediction parameters syntax

| | | Descriptor |
|---|---|---|
| 1 | pred_weight_table( ) { | |
| 2 |   luma_log2_weight_denom | ue(v) |
| 3 |   if( ChromaArrayType != 0 ) | |
| 4 |     delta_chroma_log2_weight_denom | se(v) |
| 5 |   for( i = 0; i < NumRefIdxActive[ 0 ]; i++ ) | |
| 6 |     luma_weight_l0_flag[ i ] | u(1) |
| 7 |   if( ChromaArrayType != 0 ) | |
| 8 |     for( i = 0; i < NumRefIdxActive[ 0 ]; i++ ) | |
| 9 |       chroma_weight_l0_flag[ i ] | u(1) |
| 10 |   for( i = 0; i < NumRefIdxActive[ 0 ]; i++ ) { | |
| 11 |     if( luma_weight_l0_flag[ i ] ) { | |
| 12 |       delta_luma_weight_l0[ i ] | se(v) |
| 13 |       luma_offset_l0[ i ] | se(v) |
| 14 |     } | |
| 15 |     if( chroma_weight_l0_flag[ i ] ) | |
| 16 |       for( j = 0; j < 2; j++ ) { | |
| 17 |         delta_chroma_weight_l0[ i ][ j ] | se(v) |
| 18 |         delta_chroma_offset_l0[ i ][ j ] | se(v) |
| 19 |       } | |
| 20 |   } | |
| 21 |   if( slice_type == B ) { | |
| 22 |     for( i = 0; i < NumRefIdxActive[ 1 ]; i++ ) | |
| 23 |       luma_weight_l1_flag[ i ] | u(1) |
| 24 |     if( ChromaArrayType != 0 ) | |
| 25 |       for( i = 0; i < NumRefIdxActive[ 1 ]; i++ ) | |
| 26 |         chroma_weight_l1_flag[ i ] | u(1) |
| 27 |     for( i = 0; i < NumRefIdxActive[ 1 ]; i++ ) { | |
| 28 |       if( luma_weight_l1_flag[ i ] ) { | |
| 29 |         delta_luma_weight_l1[ i ] | se(v) |
| 30 |         luma_offset_l1[ i ] | se(v) |
| 31 |       } | |
| 32 |       if( chroma_weight_l1_flag[ i ] ) | |
| 33 |         for( j = 0; j < 2; j++ ) { | |
| 34 |           delta_chroma_weight_l1[ i ][ j ] | se(v) |
| 35 |           delta_chroma_offset_l1[ i ][ j ] | se(v) |
| 36 |         } | |
| 37 |     } | |
| 38 |   } | |
| 39 | } | |

In contribution JVET-O0244 (V. Seregin et al "AHG17: On zero delta POC in reference picture structure," 15th JVET meeting, Gothenburg, Sweden), it was pointed out that In the current VVC specification draft, reference pictures are signaled in the reference picture structure (RPS), where abs_delta_poc_st represents the delta POC value, which can be equal to 0. RPS can be signaled in SPS and slice header. This functionality is needed to signal different weights for the same reference picture, and potentially is needed if layered scalability is supported with the same POC values used across layers in access unit. Therein, it is stated that the repeating reference pictures are not needed 10 when weighted prediction is not enabled. Among others, in this contribution, it is proposed to disallow zero delta POC values when weighted prediction is not enabled (i.e. WP is disabled).

TABLE 2

Sequence parameter set RBSP (Raw Byte Sequence Payload) syntax

| | | Descriptor |
|---|---|---|
| 1 | seq_parameter_set_rbsp( ) { | |
| 2 |   sps_decoding_parameter_set_id | u(4) |
| 3 |   sps_video_parameter_set_id | u(4) |
| 4 |   sps_max_sub_layers_minus1 | u(3) |
| 5 |   sps_reserved_zero_5bits | u(5) |
| 6 |   profile_tier_level( sps_max_sub_layers_minus1 ) | |
| 7 |   gdr_enabled_flag | u(1) |
| 8 |   sps_seq_parameter_set_id | ue(v) |
| 9 |   chroma_format_idc | ue(v) |
| 10 |   if( chroma_format_idc == 3 ) | |
| 11 |     separate_colour_plane_flag | u(1) |
| 12 |   pic_width_max_in_luma_samples | ue(v) |
| 13 |   pic_height_max_in_luma_samples | ue(v) |
| 14 |   subpics_present_flag | u(1) |
| 15 |   if( subpics_present_flag ) { | |
| 16 |     max_subpics_minus1 | u(8) |
| 17 |     subpic_grid_col_width_minus1 | u(v) |
| 18 |     subpic_grid_row_height_minus1 | u(v) |
| 19 |     for( i = 0; i < NumSubPicGridRows; i++ ) | |
| 20 |       for( j = 0; j < NumSubPicGridCols; j++ ) | |
| 21 |         subpic_grid_idx[ i ][ j ] | u(v) |
| 22 |     for( i = 0; i <= NumSubPics; i++ ) { | |
| 23 |       subpic_treated_as_pic_flag[ i ] | u(1) |
| 24 |       loop_filter_across_subpic_enabled_flag[ i ] | u(1) |
| 25 |     } | |
| 26 |   } | |

TABLE 2-continued

Sequence parameter set RBSP (Raw Byte Sequence Payload) syntax

|  |  | Descriptor |
|---|---|---|
| 27 | bit_depth_luma_minus8 | ue(v) |
| 28 | bit_depth_chroma_minus8 | ue(v) |
| 29 | min_qp_prime_ts_minus4 | ue(v) |
| 30 | log2_max_pic_order_cnt_lsb_minus4 | ue(v) |
| 31 | if( sps_max_sub_layers_minus1 > 0 ) | |
| 32 |   sps_sub_layer_ordering_info_present_flag | u(1) |
| 33 | for( i = ( sps_sub_layer_ordering_info_present_flag ? 0 : sps_max_sub_layers_minus1 );<br>      i <= sps_max_sub_layers_minus1; i++ ) { | |
| 34 |   sps_max_dec_pic_buffering_minus1[ i ] | ue(v) |
| 35 |   sps_max_num_reorder_pics[ i ] | ue(v) |
| 36 |   sps_max_latency_increase_plus1[ i ] | ue(v) |
| 37 | } | |
| 38 | long_term_ref_pics_flag | u(1) |
| 39 | inter_layer_ref_pics_present_flag | u(1) |
| 40 | sps_idr_rpl_present_flag | u(1) |
| 41 | rpl1_same_as_rpl0_flag | u(1) |
| 42 | for( i = 0; i < !rpl1_same_as_rpl0_flag ? 2 : 1; i++ ) { | |
| 43 |   num_ref_pic_lists_in_sps[ i ] | ue(v) |
| 44 |   for( j = 0; j < num_ref_pic_lists_in_sps[ i ]; j++) | |
| 45 |     ref_pic_list_struct( i, j ) | |
| 46 | } | |
| 47 | if( ChromaArrayType != 0 ) | |
| 48 |   qtbtt_dual_tree_intra_flag | u(1) |
| 49 | log2_ctu_size_minus5 | u(2) |
| 50 | log2_min_luma_coding_block_size_minus2 | ue(v) |
| 51 | partition_constraints_override_enabled_flag | u(1) |
| 52 | sps_log2_diff_min_qt_min_cb_intra_slice_luma | ue(v) |
| 53 | sps_log2_diff_min_qt_min_cb_inter_slice | ue(v) |
| 54 | sps_max_mtt_hierarchy_depth_inter_slice | ue(v) |
| 55 | sps_max_mtt_hierarchy_depth_intra_slice_luma | ue(v) |
| 56 | if( sps_max_mtt_hierarchy_depth_intra_slice_luma != 0 ) { | |
| 57 |   sps_log2_diff_max_bt_min_qt_intra_slice_luma | ue(v) |
| 58 |   sps_log2_diff_max_tt_min_qt_intra_slice_luma | ue(v) |
| 59 | } | |
| 60 | if( sps_max_mtt_hierarchy_depth_inter_slices != 0 ) { | |
| 61 |   sps_log2_diff_max_bt_min_qt_inter_slice | ue(v) |
| 62 |   sps_log2_diff_max_tt_min_qt_inter_slice | ue(v) |
| 63 | } | |
| 64 | if( qtbtt_dual_tree_intra_flag ) { | |
| 65 |   sps_log2_diff_min_qt_min_cb_intra_slice_chroma | ue(v) |
| 66 |   sps_max_mtt_hierarchy_depth_intra_slice_chroma | ue(v) |
| 67 |   if ( sps_max_mtt_hierarchy_depth_intra_slice_chroma != 0 ) { | |
| 68 |     sps_log2_diff_max_bt_min_qt_intra_slice_chroma | ue(v) |
| 69 |     sps_log2_diff_max_tt_min_qt_intra_slice_chroma | ue(v) |
| 70 |   } | |
| 71 | } | |
| 72 | } | |
| 73 | sps_max_luma_transform_size_64_flag | u(1) |
| 74 | if( ChromaArrayType != 0 ) { | |
| 75 |   same_qp_table_for_chroma | u(1) |
| 76 |   for( i = 0; i < same_qp_table_for_chroma ? 1 : 3; i++ ) { | |
| 77 |     num_points_in_qp_table_minus1[ i ] | ue(v) |
| 78 |     for( j = 0; j <= num_points_in_qp_table_minus1[ i ]; j++) { | |
| 79 |       delta_qp_in_val_minus1[ i ][ j ] | ue(v) |
| 80 |       delta_qp_out_val[ i ][ j ] | ue(v) |
| 81 |     } | |
| 82 |   } | |
| 83 | } | |
| 84 | sps_weighted_pred_flag | u(1) |
| 85 | sps_weighted_bipred_flag | u(1) |
| 85 | sps_sao_enabled_flag | u(1) |
| 86 | sps_alf_enabled_flag | u(1) |
| 87 | sps_transform_skip_enabled_flag | u(1) |
| 88 | if( sps_transform_skip_enabled_flag ) | |
| 89 |   sps_bdpcm_enabled_flag | u(1) |
| 90 | sps_joint_cbcr_enabled_flag | u(1) |
| 91 | sps_ref_wraparound_enabled_flag | u(1) |
| 92 | if( sps_ref_wraparound_enabled_flag ) | |
| 93 |   sps_ref_wraparound_offset_minus1 | ue(v) |
| 94 | sps_temporal_mvp_enabled_flag | u(1) |
| 95 | if( sps_temporal_mvp_enabled_flag ) | |
| 96 |   sps_sbtmvp_enabled_flag | u(1) |
| 97 | sps_amvr_enabled_flag | u(1) |
| 98 | sps_bdof_enabled_flag | u(1) |
| 99 | sps_smvd_enabled_flag | u(1) |

TABLE 2-continued

Sequence parameter set RBSP (Raw Byte Sequence Payload) syntax

| | | Descriptor |
|---|---|---|
| 100 | sps_dmvr_enabled_flag | u(1) |
| 101 | if( sps_bdof_enabled_flag \|\| sps_dmvr_enabled_flag) | |
| 102 |   sps_bdof_dmvr_slice_present_flag | u(1) |
| 103 | sps_mmvd_enabled_flag | u(1) |
| 104 | sps_isp_enabled_flag | u(1) |
| 105 | sps_mrl_enabled_flag | u(1) |
| 106 | sps_mip_enabled_flag | u(1) |
| 107 | if( ChromaArrayType != 0 ) | |
| 108 |   sps_cclm_enabled_flag | u(1) |
| 109 |   if( sps_cclm_enabled_flag && chroma_format_idc == 1 ) | |
| 110 |     sps_cclm_colocated_chroma_flag | u(1) |
| 111 | sps_mts_enabled_flag | u(1) |
| 112 | if( sps_mts_enabled_flag ) { | |
| 113 |   sps_explicit_mts_intra_enabled_flag | u(1) |
| 114 |   sps_explicit_mts_inter_enabled_flag | u(1) |
| 115 | } | |
| 116 | sps_sbt_enabled_flag | u(1) |
| 117 | if( sps_sbt_enabled_flag ) | |
| 118 |   sps_sbt_max_size_64_flag | u(1) |
| 119 | sps_affine_enabled_flag | u(1) |
| 120 | if( sps_affine_enabled_flag ) { | |
| 121 |   sps_affine_type_flag | u(1) |
| 122 |   sps_affine_amvr_enabled_flag | u(1) |
| 123 |   sps_affine_prof_enabled_flag | u(1) |
| 124 | } | |
| 125 | if( chroma_format_idc == 3 ) | |
| 126 |   sps_palette_enabled_flag | u(1) |
| 127 | sps_bcw_enabled_flag | u(1) |
| 128 | sps_ibc_enabled_flag | u(1) |
| 129 | sps_ciip_enabled_flag | u(1) |
| 130 | if( sps_mmvd_enabled_flag ) | |
| 131 |   sps_fpel_mmvd_enabled_flag | u(1) |
| 132 | sps_triangle_enabled_flag | u(1) |
| 133 | sps_lmcs_enabled_flag | u(1) |
| 134 | sps_lfnst_enabled_flag | u(1) |
| 135 | sps_ladf_enabled_flag | u(1) |
| 136 | if ( sps_ladf_enabled_flag ) { | |
| 137 |   sps_num_ladf_intervals_minus2 | u(2) |
| 138 |   sps_ladf_lowest_interval_qp_offset | se(v) |
| 139 |   for( i = 0; i < sps_num_ladf_intervals_minus2 + 1; i++ ) { | |
| 140 |     sps_ladf_qp_offset[ i ] | se(v) |
| 141 |     sps_ladf_delta_threshold_minus1[ i ] | ue(v) |
| 142 |   } | |
| 143 | } | |
| 144 | sps_scaling_list_enabled_flag | u(1) |
| 145 | hrd_parameters_present_flag | u(1) |
| 146 | if( general_hrd_parameters_present_flag ) { | |
| 147 |   num_units_in_tick | u(32) |
| 148 |   time_scale | u(32) |
| 149 |   sub_layer_cpb_parameters_present_flag | u(1) |
| 150 |   if( sub_layer_cpb_parameters_present_flag ) | |
| 151 |     general_hrd_parameters( 0, sps_max_sub_layers_minus1 ) | |
| 152 |   else | |
| 153 |   general_hrd_parameters( sps_max_sub_layers_minus1, sps_max_sub_layers_minus1 ) | |
| 154 | } | |
| 155 | vui_parameters_present_flag | u(1) |
| 156 | if( vui_parameters_present_flag ) | |
| 157 |   vui_parameters( ) | |
| 158 | sps_extension_flag | u(1) |
| 159 | if( sps_extension_flag ) | |
| 160 |   while( more_rbsp_data( ) ) | |
| 161 |     sps_extension_data_flag | u(1) |
| 162 | rbsp_trailing_bits( ) | |
| 163 | } | |

TABLE 3

Reference picture list structure syntax

| | Descriptor |
|---|---|
| 1  ref_pic_list_struct( listIdx, rplsIdx ) { | |
| 2      num_ref_entries[ listIdx ][ rplsIdx ] | ue(v) |
| 3      if( long_term_ref_pics_flag ) | |
| 4          ltrp_in_slice_header_flag[ listIdx ][ rplsIdx ] | u(1) |
| 5      for( i = 0, j = 0; i < num_ref_entries[ listIdx ][ rplsIdx ]; i++) { | |
| 6          if( inter_layer_ref_pics_present_flag ) | |
| 7              inter_layer_ref_pic_flag[ listIdx ][ rplsIdx ][ i ] | u(1) |
| 8          if( !inter_layer_ref_pics_flag[ listIdx ][ rplsIdx ][ i ] ) { | |
| 9              if( long_term_ref_pics_flag ) | |
| 10                 st_ref_pic_flag[ listIdx ][ rplsIdx ][ i ] | u(1) |
| 11             if( st_ref_pic_flag[ listIdx ][ rplsIdx ][ i ] ) { | |
| 12                 abs_delta_poc_st[ listIdx ][ rplsIdx ][ i ] | ue(v) |
| 13                 if( AbsDeltaPocSt[ listIdx ][ rplsIdx ][ i ] > 0 ) | |
| 14                     strp_entry_sign_flag[ listIdx ][ rplsIdx ][ i ] | u(1) |
| 15             } else if( !ltrp_in_slice_header_flag[ listIdx ][ rplsIdx ] ) | |
| 16                 rpls_poc_lsb_lt[ listIdx ][ rplsIdx ][ j++ ] | u(v) |
| 17         } else | |
| 18             ilrp_idc[ listIdx ][ rplsIdx ][ i ] | ue(v) |
| 19     } | |
| 20 } | |

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that: (1) has one or more slices containing ref_pic_list_idx [listIdx] equal to an index into the list of the ref_pic_list_struct(listIdx, rplsIdx) syntax structures included in the SPS, and (2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an ILRP entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

a.     for( i = 0, NumLtrpEntries[ listIdx ][ rplsIdx ] = 0; i < num_ref_entries[ listIdx ][ rplsIdx ]; i++ )if(!inter_layer_ref_pic_flag[ listIdx ][ rplsIdx ]
b.         [ i ] && !st_ref_pic_flag[ listIdx ][ rplsIdx ][ i ] )
            NumLtrpEntries[ listIdx ][ rplsIdx ]++ abs_delta_poc_st [listIdx][rplsIdx][i] specifies the value of the variable AbsDeltaPocSt[listIdx][rplsIdx][i] as follows:

a.  if( sps_weighted_pred_flag || sps_weighted_bipred_flag )
        AbsDeltaPocSt[ listIdx ][ rplsIdx ][ i ] = abs_delta_poc_st[ listIdx ][ rplsIdx ][ i ]
    else
        AbsDeltaPocSt[ listIdx ][ rplsIdx ][ i ] = abs_delta_poc_st[ listIdx ][ rplsIdx ][ i ] + 1

The value of abs_delta_poc_st [listIdx][rplsIdx][i] shall be in the range of 0 to 215−1, inclusive.

strp_entry_sign_flag[listIdx][rplsIdx][i] equal to 1 specifies that i-th entry in the syntax structure ref_pic_list_struct (listIdx, rplsIdx) has a value greater than or equal to 0. strp_entry_sign_flag[listIdx][rplsIdx][i] equal to 0 specifies that the i-th entry in the syntax structure ref_pic_list_struct (listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

a.  for( i = 0; i < num_ref_entries[ listIdx ][ rplsIdx ]; i++ )
        if(
    !inter_layer_ref_pic_flag[ listIdx ][ rplsIdx ][ i ] && st_ref_pic_flag[

-continued

```
listIdx ][ rplsIdx ][ i ] )
    DeltaPocValSt[ listIdx ][ rplsIdx ][ i ] = ( strp_entry_sign_flag[
    listIdx ][ rplsIdx ][ i ] )
?
    AbsDeltaPocSt[ listIdx ][ rplsIdx ][ i ] : 0 − AbsDeltaPocSt[
    listIdx ][ rplsIdx ][ i ])
``` rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i] syntax element is log 2_max pic_order_cnt_lsb_minus4+4 bits.

ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc [listIdx][rplsIdx][i] shall be in the range of 0 to the GeneralLayerIdx[nuh_layer_id]−1, inclusive.

In Table 2, weighted prediction parameters are signaled after reference picture list signaling. In Table 4, these syntax elements are reordered to restrict binarization of delta POC syntax element based on the values of the weighted prediction flags.

TABLE 4

Modified syntax of sequence parameter set RBSP

| | | Descriptor |
|---|---|---|
| 1 | seq_parameter_set_rbsp( ) { | |
| 2 | sps_decoding_parameter_set_id | u(4) |
| 3 | sps_video_parameter_set_id | u(4) |
| 4 | sps_max_sub_layers_minus1 | u(3) |
| 5 | sps_reserved_zero_5bits | u(5) |
| 6 | profile_tier_level( sps_max_sub_layers_minus1 ) | |
| 7 | gdr_enabled_flag | u(1) |
| 8 | sps_seq_parameter_set_id | ue(v) |
| 9 | chroma_format_idc | ue(v) |
| 10 | if( chroma_format_idc = = 3 ) | |
| 11 | separate_colour_plane_flag | u(1) |
| 12 | pic_width_max_in_luma_samples | ue(v) |
| 13 | pic_height_max_in_luma_samples | ue(v) |
| 14 | subpics_present_flag | u(1) |
| 15 | if( subpics_present_flag ) { | |
| 16 | max_subpics_minus1 | u(8) |
| 17 | subpic_grid_col_width_minus1 | u(v) |
| 18 | subpic_grid_row_height_minus1 | u(v) |
| 19 | for( i = 0; i < NumSubPicGridRows; i++ ) | |
| 20 | for( j = 0; j < NumSubPicGridCols; j++ ) | |
| 21 | subpic_grid_id[ i ][ j ] | u(v) |
| 22 | for( i = 0; i <= NumSubPics; i++ ) { | |
| 23 | subpic_treated_as_pic_flag[ i ] | u(1) |
| 24 | loop_filter_across_subpic_enabled_flag[ i ] | u(1) |
| 25 | } | |
| 26 | } | |
| 27 | bit_depth_luma_minus8 | ue(v) |
| 28 | bit_depth_chroma_minus8 | ue(v) |
| 29 | min_qp_prime_ts_minus4 | ue(v) |
| 30 | sps_weighted_pred_flag | u(1) |
| 31 | sps_weighted_bipred_flag | u(1) |
| 32 | log2_max_pic_order_cnt_lsb_minus4 | ue(v) |
| 33 | if( sps_max_sub_layers_minus1 > 0 ) | |
| 34 | sps_sub_layer_ordering_info_present_flag | u(1) |
| 35 | for( i = ( sps_sub_layer_ordering_info_present_flag ? 0 : sps_max_sub_layers_minus1 ); i <= sps_max_sub_layers_minus1; i++ ) { | |
| 36 | sps_max_dec_pic_buffering_minus1[ i ] | ue(v) |
| 37 | sps_max_num_reorder_pics[ i ] | ue(v) |
| 38 | sps_max_latency_increase_plus1[ i ] | ue(v) |
| 39 | } | |
| 40 | long_term_ref_pics_flag | u(1) |
| 41 | inter_layer_ref_pics_present_flag | u(1) |
| 42 | sps_idr_rpl_present_flag | u(1) |
| 43 | ... | |
| 44 | rpl1_same_as_rpl0_flag | u(1) |
| 45 | for( i = 0; i < !rpl1_same_as_rpl0_flag ? 2 : 1; i++ ) { | |
| 46 | num_ref_pic_lists_in_sps[ i ] | ue(v) |
| 47 | for( j = 0; j < num_ref_pic_lists_in_sps[ i ]; j++) | |
| 48 | ref_pic_list_struct( i, j ) | |
| 49 | } | |

And the value of delta POC (the variable AbsDeltaPocSt) is conditionally restored at the decoder side as follows:

abs_delta_poc_st [listIdx][rplsIdx][i] specifies the value of the variable AbsDeltaPocSt[listIdx][rplsIdx][i] as follows:

| | |
|---|---|
| a. | if( sps_weighted_pred_flag \|\| sps_weighted_bipred_flag )<br>   AbsDeltaPocSt[ listIdx ][ rplsIdx ][ i ] = abs_delta_poc_st[ listIdx ][ rplsIdx ][ i ] |
| else | |
| | AbsDeltaPocSt[ listIdx ][ rplsIdx ][ i ] = abs_delta_poc_st[ listIdx ][ rplsIdx ][ i ] + 1 |

TPM and GEO also known as triangular merge mode and geometric merge mode, respectively, are partitioning techniques that enable non-horizontal and non-vertical boundaries between prediction partitions, where prediction unit PU1 and prediction unit PU2 are combined in a region using a weighted averaging procedure of subsets of their samples related to different color components. TMP enables boundaries between prediction partitions only along a rectangular block diagonals, whereas boundaries according to GEO may be located at arbitrary positions. In the region that a weighted averaging procedure is applied to, integer numbers within squares denote weights $W_{PU1}$ applied to luma component of prediction unit PU1. In an example, weights $W_{PU2}$ applied to luma component of prediction unit PU2 are calculated as follows:

$$W_{PU2}=8-W_{PU1}.$$

Weights applied to chroma components of corresponding prediction units may differ from weights applied to luma components of corresponding prediction units.

The details on the syntax for TPM are presented in Table 5, where 4 syntax elements are used to signal information on TPM:

MergeTriangleFlag is a flag that identifies whether TPM is selected or not ("0" means that TPM is not selected; otherwise, TPM is chosen);

merge_triangle_split_dir is a split direction flag for TPM ("0" means the split direction from top-left corner to the bottom-right corner; otherwise, the split direction is from top-right corner to the bottom-left corner);

merge_triangle_idx0 and merge_triangle_idx1 are indices of merge candidates 0 and 1 used for TPM.

TABLE 5

Merge data syntax including syntax for TPM

| | | Descriptor |
|---|---|---|
| 1 | merge_data( x0, y0, cbWidth, cbHeight ) { | |
| 2 |   if ( CuPredMode[ x0 ][ y0 ] = = MODE_IBC ) { | |
| 3 |     if( MaxNumMergeCand > 1 ) | |
| 4 |       merge_idx[ x0 ][ y0 ] | ae(v) |
| 5 |   } else { | |
| 6 |     if( sps_mmvd_enabled_flag \|\| cbWidth * cbHeight != 32 ) | |
| 7 |       regular_merge_flag[ x0 ][ y0 ] | ae(v) |
| 8 |     if ( regular_merge_flag[ x0 ][ y0 ] = = 1 ){ | |
| 9 |       if( MaxNumMergeCand > 1 ) | |
| 10 |         merge_idx[ x0 ][ y0 ] | ae(v) |
| 11 |     } else { | |
| 12 |       if( sps_mmvd_enabled_flag && cbWidth * cbHeight != 32 ) | |
| 13 |         mmvd_merge_flag[ x0 ][ y0 ] | ae(v) |
| 14 |       if( mmvd_merge_flag[ x0 ][ y0 ] = = 1 ) { | |
| 15 |         if( MaxNumMergeCand > 1 ) | |
| 16 |           mmvd_cand_flag[ x0 ][ y0 ] | ae(v) |
| 17 |         mmvd_distance_idx[ x0 ][ y0 ] | ae(v) |
| 18 |         mmvd_direction_idx[ x0 ][ y0 ] | ae(v) |
| 19 |       } else { | |
| 20 |         if( MaxNumSubblockMergeCand > 0 && cbWidth >= 8 && cbHeight >= 8 ) | |
| 21 |           merge_subblock_flag[ x0 ][ y0 ] | ae(v) |
| 22 |         if( merge_subblock_flag[ x0 ][ y0 ] = = 1 ) { | |
| 23 |           if( MaxNumSubblockMergeCand > 1 ) | |
| 24 |             merge_subblock_idx[ x0 ][ y0 ] | ae(v) |
| 25 |         } else { | |
| 26 |           if( sps_ciip_enabled_flag && cu_skip_flag[ x0 ][ y0 ] = = 0 &&<br>            ( cbWidth * cbHeight) >= 64 && cbWidth < 128 && cbHeight < 128 ) { | |
| 27 |             ciip_flag[ x0 ][ y0 ] | ae(v) |
| 28 |           if( ciip_flag[ x0 ][ y0 ] && MaxNumMergeCand > 1 ) | |
| 29 |             merge_idx[ x0 ][ y0 ] | ae(v) |
| 30 |         } | |
| 31 |         if( MergeTriangleFlag[ x0 ][ y0 ] ) { | |
| 32 |           merge_triangle_split_dir[ x0 ][ y0 ] | ae(v) |
| 33 |           merge_triangle_idx0[ x0 ][ y0 ] | ae(v) |
| 34 |           merge_triangle_idx1[ x0 ][ y0 ] | ae(v) |
| 35 |         } | |
| 36 |       } | |
| 37 |     } | |
| 38 |   } | |
| 39 |   } | |
| 40 | } | |

In more detail, TPM is described in the following proposal: R-L. Liao and C. S. Lim "CE10.3.1.b: Triangular prediction unit mode," contribution JVET-L0124 to the 12$^{th}$ JVET meeting, Macao, China, October 2018. GEO is explained in the following paper: S. Esenlik, H. Gao, A. Filippov, V. Rufitskiy, A. M. Kotra, B. Wang, E. Alshina, M. Bläser, and J. Sauer, "Non-CE4: Geometrical partitioning for inter blocks," contribution JVET-O0489 to the 15$^{th}$ JVET meeting, Gothenburg, Sweden, July 2019.

The disclosed way to harmonize TPM and/or GEO with WP is to disable them when WP is applied. In the following, embodiments of the present disclosure are provided for said harmonization, i.e. for disabling TMP and/or GEO.

According to an embodiment of the present disclosure an inter prediction method is provided, comprising determining whether all reference pictures in a preset reference picture set of a current slice are disabled for slice-level weighted prediction of the current slice, and determining that non-rectangular prediction units for the current slice are disabled for the slice-level weighted prediction, when all the reference pictures are determined to be disabled, and predicting the current slice in accordance with the determination result.

This may provide an advantage for efficiently determining whether or not non-rectangular prediction units for the current slice are disabled. Also, a repeated transmission of reference pictures is avoided, and hence reduces the signaling overhead. Over and above, the disabling enables the reduction of artefacts in the inter-prediction.

Figure 7:
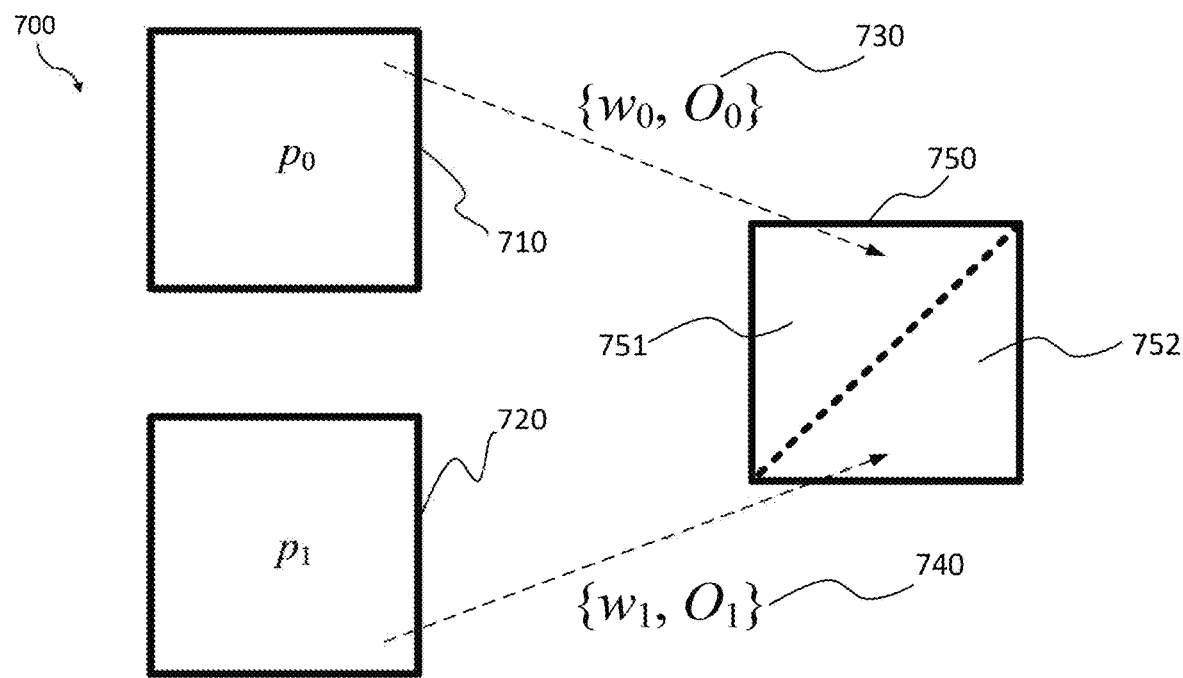
FIG. 7 illustrates an example of a triangle prediction mode.
Figure 8:
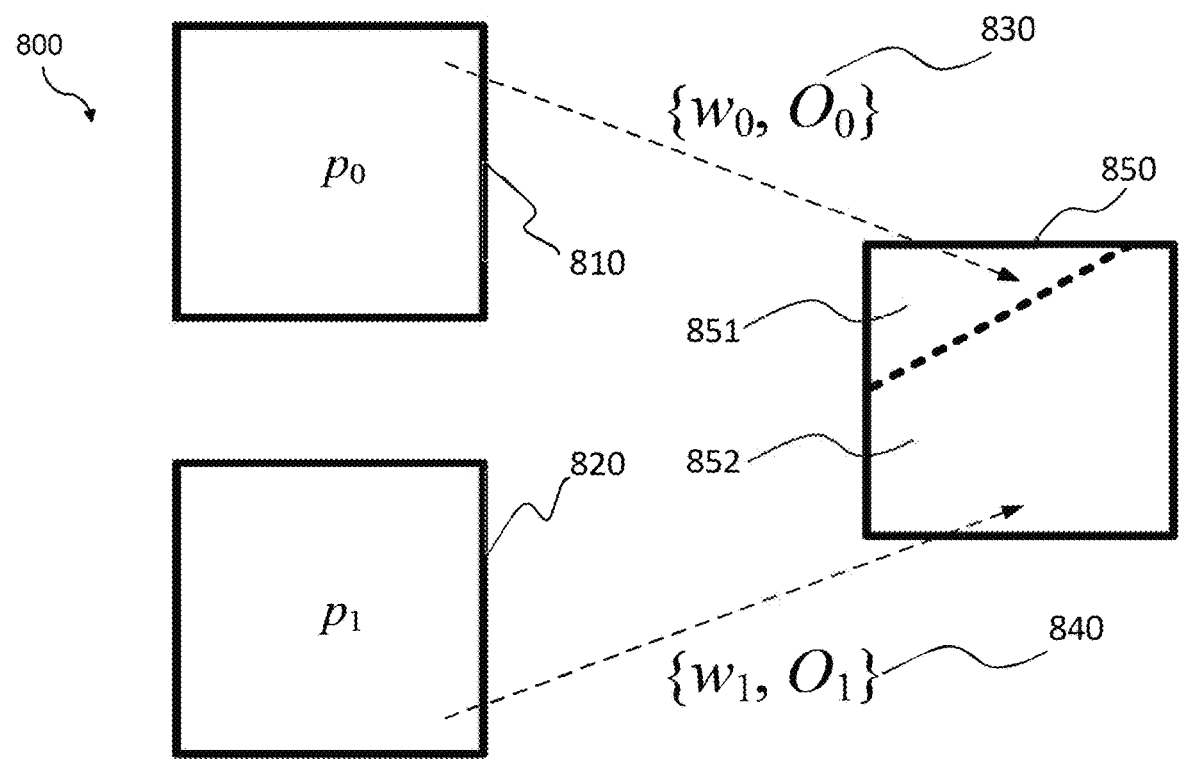
FIG. 8 illustrates an example of a geometric prediction mode.

The non-rectangular prediction unit may be also referred to as non-rectangular prediction partition. For brevity, also the terms non-rectangular unit or non-rectangular partition may be used interchangeably. Examples of such kind of units or partitions are shown, for example, in FIGS. 7 and 8. FIG. 7 shows a partition into two triangular units, where the partition boundary going through the bottom-left to top-right corner. In FIG. 8, the boundary intersects with two edges, resulting in one triangular and one multi-edge partition (for example, five edges). Alternatively, the intersection boundary may also intersect with one corner and one of the four edges. Also, the intersection boundary may have any direction (orientation) with respect to a x-y pixel coordinate axes.

Figure 11:
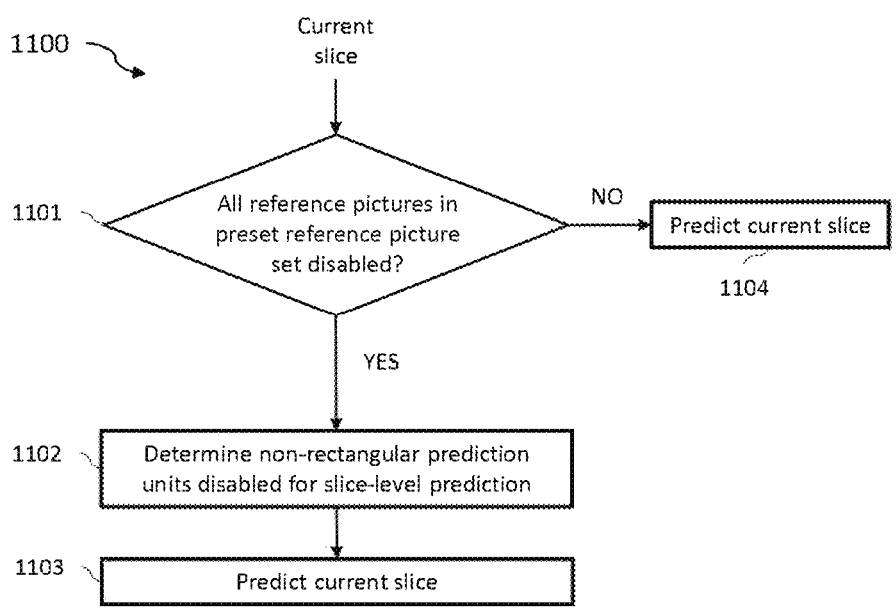
FIG. 11 is a flowchart of an inter-prediction method according to an embodiment of the present disclosure.

FIG. 11 shows a flowchart of the inter-prediction. The input is a current slice which may have a preset reference picture set. In step 1101, it is determined whether all reference pictures in the preset reference picture set are disabled for slice-level weighted prediction. If this is the case, i.e. the result of the determination is "YES", in step 1102 it is determined that non-rectangular prediction units for the current slice are disabled. This is followed in step 1103 in predicting the current slice. This means that the current slice is predicted without employing the slice-level weighted prediction. In turn, when the result of the determination in step 1101 is "NO", then the current slice is predicted in step 1104. In this case the current slice is predicted employing the slice-level weighted prediction.

Figure 16:
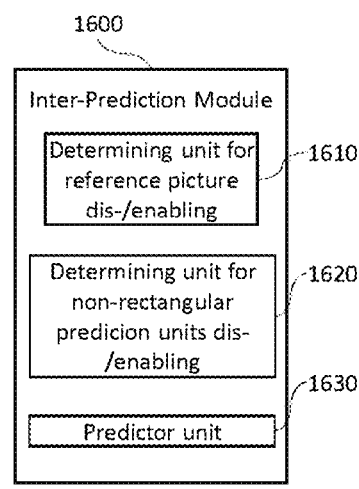
FIG. 16 is a block diagram of an inter-prediction module, including a determining unit (e.g., determining circuit) for reference picture dis-/enabling, a determining unit (e.g., determining circuit) for non-rectangular prediction units dis-/enabling, and a predictor unit (e.g., predictor circuit).

FIG. 16 shows a block diagram of inter-prediction module 1600, implementing the method according to the flowchart of FIG. 11. Module 1600 includes determining unit 1610 for reference picture dis-/enabling, determining unit 1620 for non-rectangular prediction units dis-/enabling, and predictor unit 1630. Module 1600 takes as an input, a current slice. The determining unit 1610 then determines whether all reference pictures in the preset reference picture set are disabled for slice-level weighted prediction. The unit 1610 provides as output a determination result. The determination result may, for example, be "YES" or "NO". This result is input into the determining unit 1620. In case the result is "YES", i.e. all reference pictures are disabled, the unit 1620 determines that non-rectangular prediction units for the current slice are disabled for the slice-level weighted prediction. The predictor 1630 then predicts the current slice without employing the slice-level weighted prediction. When the determination result output by unit 1610 is "NO", the predictor unit 1630 predicts the current slice employing the slice-level weighted prediction.

According to an embodiment of the present disclosure, the disabling of all the reference pictures is indicated by one or more flags.

This may provide an advantage of a simple signaling of the disabling of all the reference pictures. Hence, the signaling overhead by use of simple flag(s) is low.

According to an embodiment of the present disclosure, the one or more flags include luma-weighted flags and/or a chroma-weighted flags.

This may provide an advantage of performing the flag-based signaling in a very flexible manner. This includes setting the flags for luma and chroma independently. Alternatively, the chroma-weighted flags may be derived from the luma-weighted flags.

According to an embodiment of the present disclosure, the one or more luma weighted flags and the one or more chroma-weighted flags each refer to a list0 and a list1 of all the reference pictures, wherein the list0 includes reference pictures of a first predictor $P_0$ of the current slice and the list1 includes reference pictures of a second predictor $P_1$ of the current slice.

According to an embodiment of the present disclosure, the disabling is indicated when all the conditions are true: the luma-weighted flags of the list0 are 0; the luma weighted flags of the list1 are 0; the chroma weighted flags of the list0 are 0; and the chroma weighted flags of the list1 are 0.

This may provide an advantage of linking the luma- and/or chroma-weighted flags with the reference picture list and indicating the disabling with high flexibility. This includes formulating condition(s) for said disabling indication by combining settings of luma flags with setting of chroma flags. The value of each of the luma-weighted flags and chroma-weighted flags being 0 (i.e. zero) is an example for the value each of the flag may have. Said value is not limited to the value of zero, but may take any other value (e.g., positive and/or negative integer and/or real valued) suitable for the disabling indication. It may take also a Boolean value "true" or "false", which are often associated with values of "1" or "0" (or vice versa even though less common).

According to an embodiment of the present disclosure, determining slice-level weighted prediction is enabled in the event that any one of all the reference pictures is enabled for the weighted prediction.

This may provide an advantage of efficient determining of enabling the weighted prediction based on enabled reference pictures.

According to an embodiment of the present disclosure, the slice-level weighted prediction is a TPM or a GEO.

In TPM, triangle partitions shown in FIG. 7 are used for the slice-level weighted prediction. In GEO, the partitions may comprise one triangular unit and a multi-edge unit having e.g., five edges as shown in FIG. 8, respectively.

According to a further embodiment of the present disclosure, an inter prediction method is provided, comprising parsing an indicator from a bitstream corresponding to a current slice, and determining whether slice-level weighted prediction for non-rectangular prediction units of the current slice is enabled for the current slice according to a value of the indicator, and predicting the current slice in accordance with the determination result.

This may provide an advantage of a quick determination whether a current slice is enabled for slice-level weighted prediction from a simple indictor parsing of a bitstream. This means that said indicator does not need to be derived during decoding. Hence, the decoding processing becomes more efficient.

Figure 12:
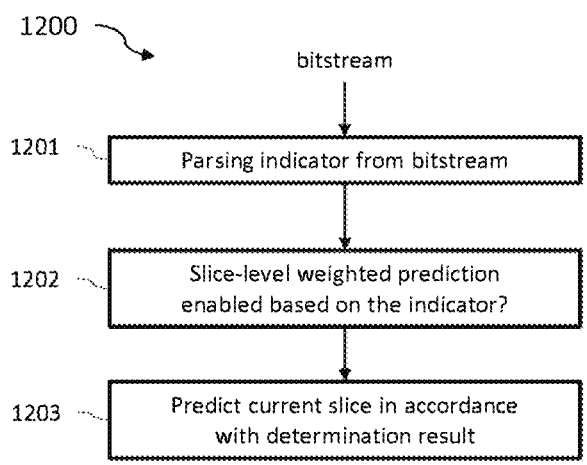
FIG. 12 is a flowchart of an inter-prediction method according to another embodiment of the present disclosure.

FIG. 12 shows a flowchart of the inter-prediction. The input is a bitstream of a current slice. In step 1201, an indicator is parsed from the bitstream. The indicator may have a value, upon which it is determined in step 1202 whether a slice-level weighted prediction for non-rectangular prediction units of the current slice is enabled. Dependent on the determination result in step 1202, the current slice is predicted in accordance with the determination result in step 1203.

Figure 17:
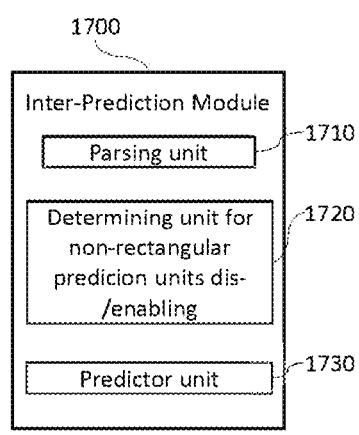
FIG. 17 is a block diagram of an inter-prediction module (e.g., inter-prediction circuit, inter-prediction apparatus), including a parsing unit (e.g., parsing circuit), a determining unit (e.g., determining circuit) for non-rectangular prediction units dis-/enabling, and a predictor unit (e.g., predictor circuit).

FIG. 17 shows a block diagram of inter-prediction module 1700, implementing the method according to the flowchart of FIG. 12. The module 1700 includes parsing unit 1710, determining unit 1720 for non-rectangular prediction units dis-/enabling, and predictor unit 1730. The module 1700 takes a bitstream as an input. The parsing unit is then parsing the bitstream for an indicator which may have a value. Based on the value, unit 1720 determines whether a slice-level weighted prediction for non-rectangular prediction units of the current slice is enabled. Depending on the determination result of the unit 1720, the predictor unit 1730 predicts the current slice.

According to an aspect of the present disclosure, the indicator is a flag.

This may provide an advantage of a simple indication. Further, said flag may be a slice_weighted_pred flag, for example. Specifically, said flag may be any of pps_weighted_pred_flag and/or a pps_weighted_bipred_flag. Therein, the term labels "pred_" and "_bipred_" refer to normal prediction and bi-prediction, respectively. The slice_weighted_pred_flag may also referred to as weightedPredFlag.

According to an embodiment of the present disclosure, the flag is based on a type of the current slice.

This may provide an advantage of performing the bitstream parsing on the basis of the type of the slice. This make the parsing more flexible.

The type may be a "P" slice or a "B"-slice. When the type is "P", the slice_weighted_pred_flag may be set equal to pps_weighted_pred_flag. When the type is "B", the slice_weighted_pred_flag may be set equal to pps_weighted_bipred_flag.

According to an embodiment of the present disclosure, the slice-level weighted prediction is determined to be enabled when the value is a first value.

According to an embodiment of the present disclosure, the slice-level weighted prediction is disabled when the value is a second value different from the first value.

This may provide an advantage of determining the enabling and disabling of the slice-level weighted prediction in a simple manner. This makes said determination more efficient.

According to an embodiment of the present disclosure, the slice-level weighted prediction is a non-rectangular prediction mode.

This may provide an advantage of extending the prediction mode to non-rectangular prediction modes. This means that predictions may be performed for those partitions that may not follow the common squared and/or rectangular shapes. Rather, predictions may be performed also for triangular shapes or mixed triangular and multi-edged shapes. This increases the flexibility of the prediction.

According to an embodiment of the present disclosure the non-rectangular prediction mode is a TPM, or a GEO.

According to a further embodiment of the present disclosure, an inter prediction method is provided, comprising determining whether a current block is a sub-block of a CU, and disabling non-rectangular prediction mode for the current block when the current block is determined being a rectangular sub-block of the CU, and predicting the current block in accordance with the determination result.

Therein, the term CU refers to a unit in general, which may be further split into (sub-)blocks having different shapes. Such shapes may include square, rectangle, triangle, and/or multi-edge (polygon including regular or irregular ones).

This may provide an advantage of a sub-block-based determining of whether or not a non-rectangular prediction mode is disabled. In particular, the determination is performed by coupling the presence of a sub-block with its shape, which may be a common rectangle. This extends the prediction to non-rectangular sub-blocks.

Figure 13:
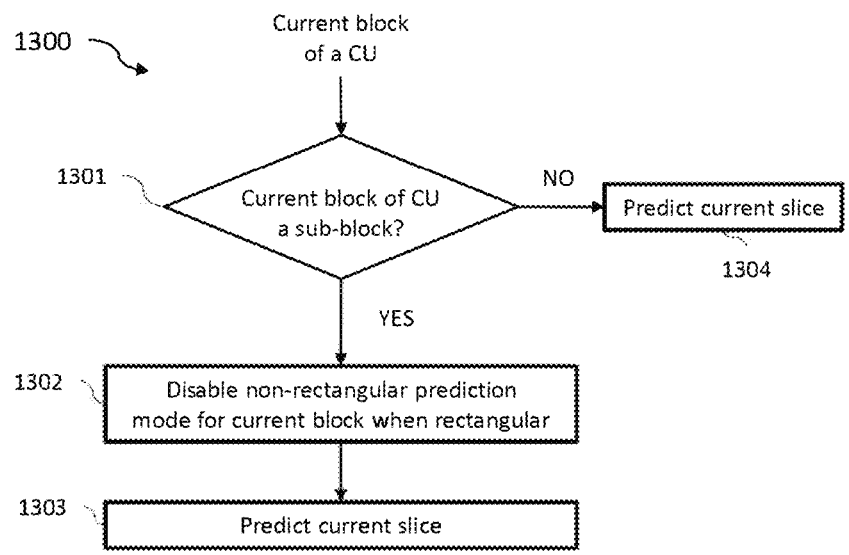
FIG. 13 is a flowchart of the inter-prediction method according to another embodiment of the present disclosure.

FIG. 13 shows a flowchart of the inter-prediction. The input is a current block of a CU. In step 1301, it is determined whether the current block is a sub-block of the CU. If the result of the determination is "YES" in step 1301, the non-rectangular prediction mode for the current block is disabled in step 1302, when the current block is a rectangular sub-block of the CU. This is followed by predicting the current slice in step 1303. This means that the current slice is predicted without employing a non-rectangular prediction modes, such as TMP or GEO, for example. If the result of the determination in step 1301 is "NO", the current slice is predicted in step 1304. This means that the current slice may be predicted employing a non-rectangular prediction modes.

Figure 18:
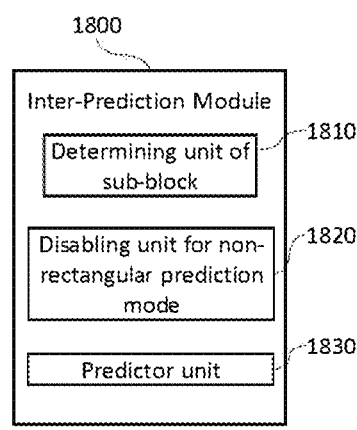
FIG. 18 is a block diagram of an inter-prediction module (e.g., inter-prediction circuit, inter-prediction apparatus), including a determining unit (e.g., determining circuit) of sub-block, a disabling unit (e.g., disabling circuit) for non-rectangular prediction mode, and a predictor unit (e.g., predictor circuit).

FIG. 18 shows a block diagram of inter-prediction module 1800, implementing the method according to the flowchart of FIG. 13. The module 1800 includes a determining unit 1810 of sub-block, a disabling unit 1820 for non-rectangular prediction mode, and a predictor unit 1730. The module 1800 takes a current block of a CU as an input. The determining unit 1810 then determines whether the current block is a sub-block of the CU. The determination result may be, for example, "YES" or "NO". The result is provided as an input to the unit 1820. When the result is "YES", unit 1820 determines that the non-rectangular prediction mode for the current block is disabled when the current block is a rectangular sub-block of the CU. The predictor unit 1830 predicts then the current slice without employing a non-rectangular prediction mode. In turn, when the result is "NO", the predictor unit 1830 predicts the current slice employing a non-rectangular prediction mode, which may be GEO or TMP, for example.

According to an embodiment of the present disclosure, weighted factors of reference pictures of the current block are not carried by a bitstream.

This may provide an advantage of reducing the signaling, and hence making the inter-prediction more efficient.

According to an embodiment of the present disclosure, the non-rectangular prediction mode is a TPM or a GEO.

According to a further embodiment of the present disclosure, an inter prediction method is provided, comprising: determining whether weighing factors of reference pictures of a current block are carried by a bitstream when the current block is processed by a sub-block based prediction mode for non-rectangular prediction units of the current block; and obtaining a prediction value of the current block according to blending weighted parameters when the weighing factors are determined not being carried by the bitstream.

This may provide an advantage of a quick determination whether or not prediction is to be performed with weighing factors already carried by the bitstream or with blending parameters. This means that normal prediction and, in particular bi-prediction may still be performed employing a weighting scheme by use of blending weighted parameters.

Figure 14:
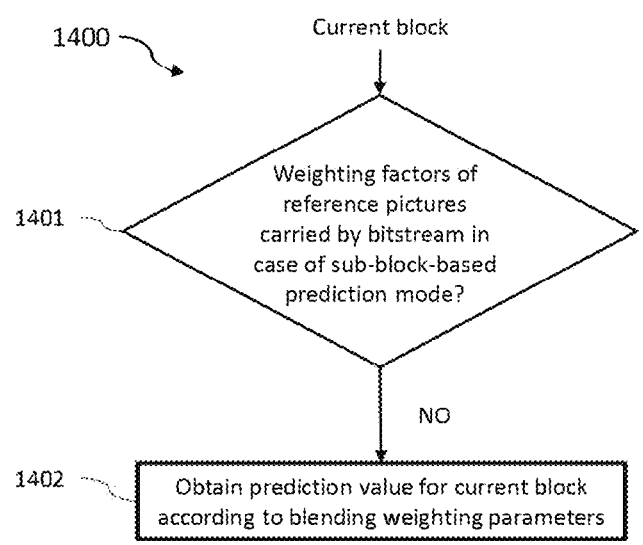
FIG. 14 is a flowchart of the inter-prediction method according to another embodiment of the present disclosure.

FIG. 14 shows a flowchart of the inter-prediction. An input of the flowchart is a current block. The current block may be transmitted by a bitstream. In step 1401, it is determined whether weighing factors of reference pictures of the current block are carried by the bitstream, when the current block is processed by a sub-block based prediction mode for non-rectangular prediction units. If this is not the case, i.e. the result of the determination is "NO", in step 1402 a prediction value of the current block is obtained according to blending weighted parameters.

Figure 19:
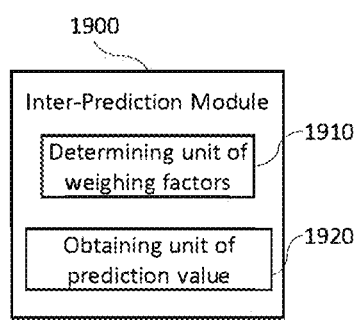
FIG. 19 is a block diagram of an inter-prediction module (e.g., inter-prediction circuit, inter-prediction apparatus), including a determining unit (e.g., determining circuit) of weighing factors and an obtaining unit (e.g., obtaining circuit) of a prediction value.

FIG. 19 shows a block diagram of inter-prediction module 1900, implementing the method according to the flowchart of FIG. 14. The module 1900 includes determining unit 1910 of weighing factors and obtaining unit 1920 of a prediction value. The module 1900 takes as an input, a current block which may be carrier by a bitstream. The unit 1910 then determines whether weighing factors of reference pictures of the current block are carried by the bitstream in case the current block is processed by a sub-block based prediction mode for non-rectangular prediction units. The result of this determination is provided as an input to the obtaining unit 1920. When the result is "NO", the unit 1920 obtains a prediction value of the current block according to blending weighted parameters.

According to an embodiment of the present disclosure, the method according to the previous aspect further comprises obtaining the prediction value of the current block according to the weighing factors when the weighing factors are determined being carried by the bitstream.

This may provide an advantage of performing weighted prediction with weighing factors. This enables performing the prediction of the current block in a more flexible manner, since weighing factors are per se not limited in their values. Thus, the prediction may be performed more accurately.

According to an embodiment of the present disclosure, the sub-block-based prediction mode is a non-rectangular prediction mode.

According to an embodiment of the present disclosure, the non-rectangular prediction mode comprises a TPM, or a GEO.

According to a further embodiment of the present disclosure, an apparatus for inter-prediction is provided, comprising a processor and a memory configured to be coupled to the processor; and the processor is further configured to implement any one of the methods according to the previous aspects of the present disclosure.

This may provide an advantage of performing inter-prediction by said apparatus by exploiting any of the above-mentioned advantages of said methods, each being implemented by the processor.

Figure 15:
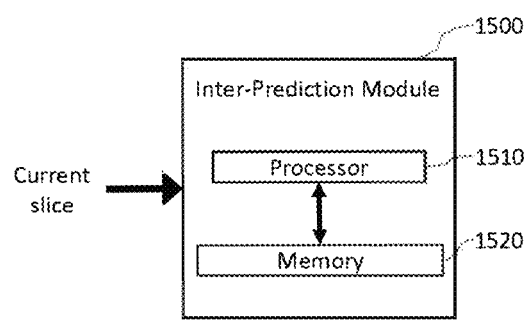
FIG. 15 is a block diagram of the inter-prediction module, including a processor and a memory connected to each other for performing communication for exchange of instructions and/or data.

FIG. 15 shows an apparatus 1500 for inter-prediction. The apparatus 1500 (also referred to as module) includes a processor 1510 and a memory 1520. Processor and memory are connected to each other, so as to communicate for exchange of instructions and/or data. For example, the memory may store a program corresponding to instructions for executing any of the steps of the previous methods. Said execution of the method steps is performed by the processor.

According to an embodiment of the present disclosure, a bitstream corresponding to a current block is provided, comprising a first indicator indicating a CU, comprising the current block is processed with a sub-block based prediction mode for non-rectangular prediction units of the current block, and the bitstream is forbidden to carry a second indicator indicating a weighting factor.

This may provide an advantage of decoding the bitstream more efficiently.

According to an embodiment of the present disclosure, the sub-block-based prediction mode is a non-rectangular prediction mode.

According to an embodiment of the present disclosure, the non-rectangular prediction mode comprises a TPM, or a GEO.

According to an embodiment of the present disclosure, a prediction mode of the current block is the triangle prediction mode when the first indicator is a first value.

For example, the first indicator may be MergeTriangleFlag.

According to an embodiment of the present disclosure, the first indicator is the first value when all the conditions are true: sps_triangle_enabled_flag is equal to 1; slice_type is equal to B; general_merge_flag[x0][y0] is equal to 1; MaxNumTriangleMergeCand is greater than or equal to 2; cbWidth*cbHeight is greater than or equal to 64; regular_merge_flag[x0][y0] is equal to 0; merge_subblock_flag[x0][y0] is equal to 0; ciip_flag[x0][y0] is equal to 0; and weightedPredFlag is equal to 0; wherein B indicates bi-partitioning of the current block, cbWidth and cbHeight are the width and height of the current block, and [x0][y0] is an x- and y-position of a luma sample at the top-left of the current block.

This may provide an advantage of making the first indicator being the first value dependent on a variety of different conditions, including, for example, a criteria on the size of the current block, slice type, triangle enabled, etc. This makes the signaling via the bitstream more efficient, while accounting for many condition requirements by a single value of the first indicator.

According to an embodiment of the present disclosure, when the first indicator is the first value, the bit stream further carries a third indicator, indicating a split direction of the current block.

This may provide an advantage of signaling also the split direction of the current block in the bitstream. However, said signaling may be only performed if the first indicator is the first value. Thus, the bitstream contains only signaling information that is really needed for performing the non-rectangular prediction, and hence may reduce the signaling overhead.

The third indicator may be a flag merge_triangle_split_dir.

According to an embodiment of the present disclosure, the bitstream further carries the second indicator when the first indicator is a second value.

This may provide an advantage of including a second indicator, which indicates a weighting factor, into the bitstream.

The embodiments discussed above refer to manners by which non-rectangular prediction modes, such as TPM and/or GEO, may be disabled when WP is applied. In the following, further details are provided for the disabling with reference to specific flags following a particular syntax, and as detailed in the tables below.

Table 6 shows that the disabling may be done by checking whether the value of the weightedPredFlag variable is equal to 0 for a CU.

The variable weightedPredFlag is derived as follows:

If slice_type is equal to P, weightedPredFlag is set equal to pps_weighted_pred_flag.

Otherwise (slice_type is equal to B), weightedPredFlag is set equal to pps_weighted_bipred_flag.

Slice-level weighted prediction process could be switched at picture and slice levels using pps_weighted_pred_flag and sps_weighted_pred_flag syntax elements, respectively.

As disclosed above, the variable weightedPredFlag indicates whether slice-level weighted prediction should be used when obtaining inter predicted samples of the slice.

TABLE 6

The disclosed merge data syntax to harmonize TPM with WP

| | | Descriptor |
|---|---|---|
| 1 | merge_data( x0, y0, cbWidth, cbHeight, chType ) { | |
| 2 | if ( CuPredMode[ chType ][ x0 ][ y0 ] = = MODE_IBC ) { | |
| 3 | if( MaxNumIbcMergeCand > 1 ) | |
| 4 | merge_idx[ x0 ][ y0 ] | ae(v) |
| 5 | } else { | |
| 6 | if( MaxNumSubblockMergeCand > 0 && cbWidth >= 8 && cbHeight >= 8 ) | |
| 7 | merge_subblock_flag[ x0 ][ y0 ] | ae(v) |
| 8 | if( merge_subblock_flag[ x0 ][ y0 ] = = 1 ) { | |
| 9 | if( MaxNumSubblockMergeCand > 1 ) | |
| 10 | merge_subblock_idx[ x0 ][ y0 ] | ae(v) |
| 11 | } else { | |
| 12 | if( ( cbWidth * cbHeight) >= 64 && ( (sps_ciip_enabled_flag && cu_skip_flag[ x0 ][ y0 ] = = 0 && cbWidth <128 && cbHeight < 128) \|\| ( sps_triangle_enabled_flag && MaxNumTriangleMergeCand > 1 && slice_type = = B ) ) ) | |
| 13 | regular_merge_flag[ x0 ][ y0 ] | ae(v) |
| 14 | if ( regular_merge_flag[ x0 ][ y0 ] = = 1 ){ | |
| 15 | if( sps_mmvd_enabled_flag ) | |
| 16 | mmvd_merge_flag[ x0 ][ y0 ] | ae(v) |
| 17 | if( mmvd_merge_flag[ x0 ][ y0 ] = = 1 ) { | |
| 18 | if( MaxNumMergeCand > 1 ) | |
| 19 | mmvd_cand_flag[ x0 ][ y0 ] | ae(v) |
| 20 | mmvd_distance_idx[ x0 ][ y0 ] | ae(v) |
| 21 | mmvd_direction_idx[ x0 ][ y0 ] | ae(v) |
| 22 | } else { | |
| 23 | if( MaxNumMergeCand > 1 ) | |
| 24 | merge_idx[ x0 ][ y0 ] | ae(v) |
| 25 | } | |
| 26 | } else { | |
| 27 | if( sps_ciip_enabled_flag && sps_triangle_enabled_flag && MaxNumTriangleMergeCand > 1 && weightedPredFlag = = 0 && slice_type = = B && cu_skip_flag[ x0 ][ y0 ] = = 0 && ( cbWidth * cbHeight ) >= 64 && cbWidth < 128 && cbHeight < 128 ) { | |
| 28 | ciip_flag[ x0 ][ y0 ] | ae(v) |
| 29 | if( ciip_flag[ x0 ][ y0 ] && MaxNumMergeCand > 1 ) | |
| 30 | merge_idx[ x0 ][ y0 ] | ae(v) |
| 31 | if( !ciip_flag[ x0 ][ y0 ] && MaxNumTriangleMergeCand > 1 ) { | |
| 32 | merge_triangle_split_dir[ x0 ][ y0 ] | ae(v) |
| 33 | merge_triangle_idx0[ x0 ][ y0 ] | ae(v) |
| 34 | merge_triangle_idx1[ x0 ][ y0 ] | ae(v) |
| 35 | } | |
| 36 | } | |
| 37 | } | |
| 38 | } | |
| 39 | } | | ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:
If all the following conditions are true, ciip_flag[x0][y0] is inferred to be equal to 1:
sps_ciip_enabled_flag is equal to 1.
general_merge_flag[x0][y0] is equal to 1.
merge_subblock_flag[x0][y0] is equal to 0.
regular_merge_flag[x0][y0] is equal to 0.
cbWidth is less than 128.
cbHeight is less than 128.
cbWidth*cbHeight is greater than or equal to 64.
Otherwise, ciip_flag[x0][y0] is inferred to be equal to 0.
When ciip_flag[x0][y0] is equal to 1, the variable IntraPredModeY[x][y] with x=x0 . . . x0+cbWidth-1 and y=y0 . . . y0+cbHeight-1 is set to be equal to INTRA PLANAR.

The variable MergeTriangleFlag [x0][y0], which specifies whether triangular shape based motion compensation is used to generate the prediction samples of the current coding unit, when decoding a B slice (slice type is "B"), is derived as follows:
If all the following conditions are true, MergeTriangleFlag [x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
weightedPredFlag is equal to 0.
Otherwise, MergeTriangleFlag [x0][y0] is set equal to 0.
Table 7 shows a general slice header syntax so as to harmonize TMP with WP.

|  |  | Descriptor |
|---|---|---|
| 1 | slice_header( ) { |  |
| 2 |   slice_pic_parameter_set_id | ue(v) |
| 3 |   if( rect_slice_flag \|\| NumBricksInPic > 1 ) |  |
| 4 |     slice_address | u(v) |
| 5 |   if( !rect_slice_flag && !single_brick_per_slice_flag ) |  |
| 6 |     num_bricks_in_slice_minus1 | ue(v) |
| 7 |   non_reference_picture_flag | u(1) |
| 8 |   slice_type | ue(v) |
| 9 |   if( separate_colour_plane_flag = = 1 ) |  |
| 10 |     colour_plane_id | u(2) |
| 11 |   slice_pic_order_cnt_lsb | u(v) |
| 12 |   if( nal_unit_type = = GDR_NUT ) |  |
| 13 |     recovery_poc_cnt | ue(v) |
| 14 |   if( nal_unit_type = = IDR_W_RADL \|\| nal_unit_type = = IDR_N_LP \|\|<br>    nal_unit_type = = CRA_NUT \|\| NalUnitType = = GDR_NUT ) |  |
| 15 |     no_output_of_prior_pics_flag | u(1) |
| 16 |   if( output_flag_present_flag ) |  |
| 17 |     pic_output_flag | u(1) |
| 18 |   if( ( nal_unit_type != IDR_W_RADL && nal_unit_type != IDR_N_LP ) \|\|<br>    sps_idr_rpl_present_flag ) { |  |
| 19 |     for( i = 0; i < 2; i++ ) { |  |
| 20 |       if( num_ref_pic_lists_in_sps[ i ] > 0 && !pps_ref_pic_list_sps_idc[ i ] &&<br>        ( i = = 0 \|\| ( i = = 1 && rpl1_idx_present_flag ) ) ) |  |
| 21 |         ref_pic_list_sps_flag[ i ] | u(1) |
| 22 |       if( ref_pic_list_sps_flag[ i ] ) { |  |
| 23 |         if( num_ref_pic_lists_in_sps[ i ] > 1 &&<br>          ( i = = 0 \|\| ( i = = 1 && rpl1_idx_present_flag ) ) ) |  |
| 24 |  |  |
| 25 |           ref_pic_list_idx[ i ] | u(v) |
| 26 |       } else |  |
| 27 |         ref_pic_list_struct( i, num_ref_pic_lists_in_sps[ i ] ) |  |
| 28 |       for( j = 0; j < NumLtrpEntries[ i ][ RplsIdx[ i ] ]; j++ ) { |  |
| 29 |         if( ltrp_in_slice_header_flag[ i ][ RplsIdx[ i ] ] ) |  |
| 30 |           slice_poc_lsb_lt[ i ][ j ] | u(v) |
| 31 |         delta_poc_msb_present_flag[ i ][ j ] | u(1) |
| 32 |         if( delta_poc_msb_present_flag[ i ][ j ] ) |  |
| 33 |           delta_poc_msb_cycle_lt[ i ][ j ] | ue(v) |
| 34 |       } |  |
| 35 |     } |  |
| 36 |     if( ( slice_type != I && num_ref_entries[ 0 ][ RplsIdx[ 0 ] ] > 1 ) \|\|<br>      ( slice_type = = B && num_ref_entries[ 1 ][ RplsIdx[ 1 ] ] > 1 ) ) { |  |
| 37 |       num_ref_idx_active_override_flag | u(1) |
| 38 |       if( num_ref_idx_active_override_flag ) |  |
| 39 |         for( i = 0; i < ( slice_type = = B ? 2: 1 ); i++ ) |  |
| 40 |           if( num_ref_entries[ i ][ RplsIdx[ i ] ] > 1 ) |  |

-continued

|     |                                                                                                                                                                                                 | Descriptor |
| --- | ----------------------------------------------------------------------------------------------------------------------------------------------------------------------------------------------- | ---------- |
| 41  |               num_ref_idx_active_minus1[ i ]                                                                              | ue(v)      |
| 42  |            }                                                                                                                             |            |
| 43  |         }                                                                                                                                               |            |
| 44  |     if( partition_constraints_override_enabled_flag ) {                                                                                                                    |            |
| 45  |       partition_constraints_override_flag                                                                                                                         | ue(v)      |
| 46  |       if( partition_constraints_override_flag ) {                                                                                                                |            |
| 47  |         slice_log2_diff_min_qt_min_cb_luma                                                                                                              | ue(v)      |
| 48  |         slice_max_mtt_hierarchy_depth_luma                                                                                                              | ue(v)      |
| 49  |         if( slice_max_mtt_hierarchy_depth_luma != 0 )                                                                                                  |            |
| 50  |           slice_log2_diff_max_bt_min_qt_luma                                                                                                  | ue(v)      |
| 51  |           slice_log2_diff_max_tt_min_qt_luma                                                                                                  | ue(v)      |
| 52  |         }                                                                                                                                               |            |
| 53  |         if( slice_type == I && qtbtt_dual_tree_intra_flag ) {                                                                                          |            |
| 54  |           slice_log2_diff_min_qt_min_cb_chroma                                                                                                | ue(v)      |
| 55  |           slice_max_mtt_hierarchy_depth_chroma                                                                                                | ue(v)      |
| 56  |           if( slice_max_mtt_hierarchy_depth_chroma != 0 )                                                                                    |            |
| 57  |             slice_log2_diff_max_bt_min_qt_chroma                                                                                    | ue(v)      |
| 58  |             slice_log2_diff_max_tt_min_qt_chroma                                                                                    | ue(v)      |
| 59  |         }                                                                                                                                               |            |
| 60  |       }                                                                                                                                                            |            |
| 61  |     }                                                                                                                                                                        |            |
| 62  |   }                                                                                                                                                                                    |            |
| 63  |   if ( slice_type != I ) {                                                                                                                                                            |            |
| 64  |     if( sps_temporal_mvp_enabled_flag && !pps_temporal_mvp_enabled_idc )                                                                                                    |            |
| 65  |       slice_temporal_mvp_enabled_flag                                                                                                                             | u(1)       |
| 66  |     if( slice_type == B && !pps_mvd_l1_zero_idc )                                                                                                                          |            |
| 67  |       mvd_l1_zero_flag                                                                                                                                             | u(1)       |
| 68  |     if( cabac_init_present_flag )                                                                                                                                            |            |
| 69  |       cabac_init_flag                                                                                                                                              | u(1)       |
| 70  |     if( slice_temporal_mvp_enabled_flag ) {                                                                                                                                 |            |
| 71  |       if( slice_type == B && !pps_collocated_from_l0_idc )                                                                                                       |            |
| 72  |         collocated_from_l0_flag                                                                                                                          | u(1)       |
| 73  |       if( ( collocated_from_l0_flag && NumRefIdxActive[ 0 ] > 1 ) \|\| ( !collocated_from_l0_flag && NumRefIdxActive[ 1 ] > 1 ) ) |            |
| 74  |         collocated_ref_idx                                                                                                                              | ue(v)      |
| 75  |     }                                                                                                                                                                        |            |
| 76  |     if( ( pps_weighted_pred_flag && slice_type == P ) \|\| ( pps_weighted_bipred_flag && slice_type == B ) )                                                                |            |
| 77  |       pred_weight_table( )                                                                                                                                         |            |
| 78  |     if( !pps_six_minus_max_num_merge_cand_plus1 )                                                                                                                            |            |
| 79  |       six_minus_max_num_merge_cand                                                                                                                                 | ue(v)      |
| 80  |     if( sps_affine_enabled_flag && !pps_five_minus_max_num_subblock_merge_cand_plus1 )                                                                                      |            |
| 81  |       five_minus_max_num_subblock_merge_cand                                                                                                                      | ue(v)      |
| 82  |     if( sps_fpel_mmvd_enabled_flag )                                                                                                                                         |            |
| 83  |       slice_fpel_mmvd_enabled_flag                                                                                                                                 | u(1)       |
| 84  |     if( sps_bdof_dmvr_slice_present_flag )                                                                                                                                   |            |
| 85  |       slice_disable_bdof_dmvr_flag                                                                                                                                 | u(1)       |
| 86  |     if( sps_triangle_enabled_flag && MaxNumMergeCand >= 2 && slice_type == B && !weightedPredFlag && !pps_max_num_merge_cand_minus_max_num_triangle_cand_minus1 ) { |            |
| 87  |       max_num_merge_cand_minus_max_num_triangle_cand                                                                                                              | ue(v)      |
| 88  |     }                                                                                                                                                                        |            |
| 89  |   }                                                                                                                                                                                    |            |
| 90  |   if ( sps_ibc_enabled_flag )                                                                                                                                                         |            |
| 91  |     slice_six_minus_max_num_ibc_merge_cand                                                                                                                                  | ue(v)      |
| 92  |   if( sps_joint_cbcr_enabled_flag )                                                                                                                                                    |            |
| 93  |     slice_joint_cbcr_sign_flag                                                                                                                                               | u(1)       |
| 94  |   slice_qp_delta                                                                                                                                                                       | se(v)      |
| 95  |   if( pps_slice_chroma_qp_offsets_present_flag ) {                                                                                                                                    |            |
| 96  |     slice_cb_qp_offset                                                                                                                                                       | se(v)      |
| 97  |     slice_cr_qp_offset                                                                                                                                                       | se(v)      |
| 98  |     if( sps_joint_cbcr_enabled_flag )                                                                                                                                        |            |
| 99  |       slice_joint_cbcr_qp_offset                                                                                                                                   | se(v)      |
| 100 |   }                                                                                                                                                                                    |            |
| 101 |   if( sps_sao_enabled_flag ) {                                                                                                                                                         |            |
| 102 |     slice_sao_luma_flag                                                                                                                                                      | u(1)       |
| 103 |     if( ChromaArrayType != 0 )                                                                                                                                               |            |
| 104 |       slice_sao_chroma_flag                                                                                                                                        | u(1)       |
| 105 |   }                                                                                                                                                                                    |            |

| | | Descriptor |
|---|---|---|
| 106 | if( sps_alf_enabled_flag ) { | |
| 107 |   slice_alf_enabled_flag | u(1) |
| 108 |   if( slice_alf_enabled_flag ) { | |
| 109 |     slice_num_alf_aps_ids_luma | u(3) |
| 110 |     for( i = 0; i < slice_num_alf_aps_ids_luma; i++ ) | |
| 111 |       slice_alf_aps_id_luma[ i ] | u(3) |
| 112 |     if( ChromaArrayType != 0 ) | |
| 113 |       slice_alf_chroma_idc | u(2) |
| 114 |     if( slice_alf_chroma_idc ) | |
| 115 |       slice_alf_aps_id_chroma | u(3) |
| 116 |   } | |
| 117 | } | |
| 118 | if ( !pps_dep_quant_enabled_flag ) | |
| 119 |   dep_quant_enabled_flag | u(1) |
| 120 | if( ! dep_quant_enabled_flag ) | |
| 121 |   sign_data_hiding_enabled_flag | u(1) |
| 122 | if( deblocking_filter_override_enabled_flag ) | |
| 123 |   deblocking_filter_override_flag | u(1) |
| 124 | if( deblocking_filter_override_flag ) { | |
| 125 |   slice_deblocking_filter_disabled_flag | u(1) |
| 126 |   if( !slice_deblocking_filter_disabled_flag ) { | |
| 127 |     slice_beta_offset_div2 | se(v) |
| 128 |     slice_tc_offset_div2 | se(v) |
| 129 |   } | |
| 130 | } | |
| 131 | if( sps_lmcs_enabled_flag ) { | |
| 132 |   slice_lmcs_enabled_flag | u(1) |
| 133 |   if( slice_lmcs_enabled_flag ) { | |
| 134 |     slice_lmcs_aps_id | u(2) |
| 135 |     if( ChromaArrayType != 0 ) | |
| 136 |       slice_chroma_residual_scale_flag | u(1) |
| 137 |   } | |
| 138 | } | |
| 139 | if( sps_scaling_list_enabled_flag ) { | |
| 140 |   slice_scaling_list_present_flag | u(1) |
| 141 |   if( slice_scaling_list_present_flag ) | |
| 142 |     slice_scaling_list_aps_id | u(3) |
| 143 | } | |
| 144 | if( entry_point_offsets_present_flag && NumEntryPoints > 0 ) { | |
| 145 |   offset_len_minus1 | ue(v) |
| 146 |   for( i = 0; i < NumEntryPoints; i++ ) | |
| 147 |     entry_point_offset_minus1[ i ] | u(v) |
| 148 | } | |
| 149 | if( slice_header_extension_present_flag ) { | |
| 150 |   slice_header_extension_length | ue(v) |
| 151 |   for( i = 0; i < slice_header_extension_length; i++) | |
| 152 |     slice_header_extension_data_byte[ i ] | u(8) |
| 153 | } | |
| 154 | byte_alignment( ) | |
| 155 | } | |

If weightedPredFlag is equal to 1, the syntax element max_num_merge_cand_minus_max_num_triangle_cand is not present and inferred with such a value that MaxNumTriangleMergeCand becomes less than 2. When slice_type="I" (Table 7: line 36), the current slice is predicted without inter prediction, but intra prediction. Table 7. The disclosed general slice header syntax to harmonize TPM with WP In Particular, the Following Semantics May be Used:

max_num_merge_cand_minus_max_num_triangle_cand specifies the maximum number of triangular merge mode candidates supported in the slice subtracted from MaxNumMergeCand.

When max_num_merge_cand_minus_max_num_triangle_cand is not present, and sps_triangle_enabled_flag is equal to 1, slice_type is equal to B, weightedPredFlag is equal to 0, and MaxNumMergeCand greater than or equal to 2, max_num_merge_cand_minus_max_num_triangle_cand is inferred to be equal to pps_max_num_merge_cand_minus_max_num_triangle_cand_minus1+1.

When max_num_merge_cand_minus_max_num_triangle_cand is not present, and sps_triangle_enabled_flag is equal to 1, slice_type is equal to B, weightedPredFlag is equal to 1, and MaxNumMergeCand greater than or equal to 2, max_num_merge_cand_minus_max_num_triangle_cand is inferred to be equal to MaxNumMergeCand or MaxNumMergeCand-1.

The maximum number of triangular merge mode candidates, MaxNumTriangleMergeCand is derived as follows:

MaxNumTriangleMergeCand=MaxNumMergeCand-max_num_merge_cand_minus_max_num_triangle_cand.

When max_num_merge_cand_minus_max_num_triangle_cand is present, the value of MaxNumTriangleMergeCand shall be in the range of 2 to MaxNumMergeCand, inclusive.

When max_num_merge_cand_minus_max_num_triangle_cand is not present, and (sps_triangle_enabled_flag is equal to 0 or MaxNumMergeCand is less than 2), MaxNumTriangleMergeCand is set equal to 0.

When MaxNumTriangleMergeCand is equal to 0, triangle merge mode is not allowed for the current slice.

The disclosed mechanisms are applicable not only TPM and GEO, but also to other non-rectangular prediction and partitioning modes such as combined intra-inter prediction with triangular partitions.

Since TPM and GEO is only applied in B slice (slice type is "B"), the variable weightedPredFlag discussed before may be replaced by the variable pps_weighted_bipred_flag directly.

Table 6 shows that this may be implemented by checking whether the value of the weightedPredFlag variable is equal to 0 for a coding unit.

The variable weightedPredFlag is derived as follows:
If all of the following conditions are true, weightedPredFlag is set to 0
luma_weight_l0_flag[i] is equal to 0 for i from 0 to NumRefIdxActive[0]
luma_weight_l1_flag[i] is equal to 0 for i from 0 to NumRefIdxActive[1]
chroma_weight_l0_flag[i] is equal to 0 for i from 0 to NumRefIdxActive[0]
chroma_weight_l0_flag[i] is equal to 0 for i from 0 to NumRefIdxActive[1]
Otherwise, weightedPredFlag is set to 1

The derivation process of weightedPredFlag means: if all weighted flags for luma and chroma components, and for all reference index of current slice are 0, weighted prediction is disabled in the current slice. Otherwise, the weighted prediction may be used for the current slice.

As disclosed above, the variable weightedPredFlag indicates whether a slice-level weighted prediction should be used when obtaining inter predicted samples of the slice.

Table 6 shows the weightedPredFlag being replaced by slice_weighted_pred_flag, which is signaled in the slice header as shown in Table 8.

As disclosed above, the syntax slice_weighted_pred_flag indicates a whether slice-level weighted prediction should be used when obtaining inter predicted samples of the slice. When slice_type="I" (Table 8: line 36), the current slice is predicted without inter prediction, but intra prediction.

TABLE 8

The disclosed general slice header syntax to signal slice-level weighted prediction flag

| | | Descriptor |
|---|---|---|
| 1 | slice_header( ) { | |
| 2 |   slice_pic_parameter_set_id | ue(v) |
| 3 |   if( rect_slice_flag \|\| NumBricksInPic > 1 ) | |
| 4 |     slice_address | u(v) |
| 5 |   if( !rect_slice_flag && !single_brick_per_slice_flag ) | |
| 6 |     num_bricks_in_slice_minus1 | ue(v) |
| 7 |   non_reference_picture_flag | u(1) |
| 8 |   slice_type | ue(v) |
| 9 |   if( separate_colour_plane_flag = = 1 ) | |
| 10 |     colour_plane_id | u(2) |
| 11 |   slice_pic_order_cnt_lsb | u(v) |
| 12 |   if( nal_unit_type = = GDR_NUT ) | |
| 13 |     recovery_poc_cnt | ue(v) |
| 14 |   if( nal_unit_type = = IDR_W_RADL \|\| nal_unit_type = = IDR_N_LP \|\|<br>    nal_unit_type = = CRA_NUT \|\| NalUnitType = = GDR_NUT ) | |
| 15 |     no_output_of_prior_pics_flag | u(1) |
| 16 |   if( output_flag_present_flag ) | |
| 17 |     pic_output_flag | u(1) |
| 18 |   if( ( nal_unit_type != IDR_W_RADL && nal_unit_type != IDR_N_LP ) \|\|<br>    sps_idr_rpl_present_flag ) { | |
| 19 |     for( i = 0; i < 2; i++ ) { | |
| 20 |       if( num_ref_pic_lists_in_sps[ i ] > 0<br>      && !pps_ref_pic_list_sps_idc[ i ] &&<br>        ( i = = 0 \|\| ( i = = 1 && rpl1_idx_present_flag ) ) ) | |
| 21 |         ref_pic_list_sps_flag[ i ] | u(1) |
| 22 |       if( ref_pic_list_sps_flag[ i ] ) { | |
| 23 |         if( num_ref_pic_lists_in_sps[ i ] > 1 &&<br>          ( i = = 0 \|\| ( i = = 1 && rpl1_idx_present_flag ) ) ) | |
| 24 | | |
| 25 |           ref_pic_list_idx[ i ] | u(v) |
| 26 |       } else | |
| 27 |         ref_pic_list_struct( i, num_ref_pic_lists_in_sps[ i ] ) | |
| 28 |       for( j = 0; j < NumLtrpEntries[ i ][ RplsIdx[ i ] ]; j++ ) { | |
| 29 |         if( ltrp_in_slice_header_flag[ i ][ RplsIdx[ i ] ] ) | |
| 30 |           slice_poc_lsb_lt[ i ][ j ] | u(v) |
| 31 |         delta_poc_msb_present_flag[ i ][ j ] | u(1) |
| 32 |         if( delta_poc_msb_present_flag[ i ][ j ] ) | |
| 33 |           delta_poc_msb_cycle_lt[ i ][ j ] | ue(v) |
| 34 |       } | |
| 35 |     } | |
| 36 |     if( ( slice_type != I && num_ref_entries[ 0 ][ RplsIdx[ 0 ] ] > 1 ) \|\|<br>      ( slice_type = = B &&<br>    num_ref_entries[ 1 ][ RplsIdx[ 1 ] ] > 1 ) ) { | |

TABLE 8-continued

The disclosed general slice header syntax to signal slice-level weighted prediction flag

| | | Descriptor |
|---|---|---|
| 37 | num_ref_idx_active_override_flag | u(1) |
| 38 | if( num_ref_idx_active_override_flag ) | |
| 39 | for( i = 0; i < ( slice_type = = B ? 2: 1 ); i++ ) | |
| 40 | if( num_ref_entries[ i ][ RplsIdx[ i ] ] > 1 ) | |
| 41 | num_ref_idx_active_minus1[ i ] | ue(v) |
| 42 | } | |
| 43 | } | |
| 44 | if( partition_constraints_override_enabled_flag ) { | |
| 45 | partition_constraints_override_flag | ue(v) |
| 46 | if( partition_constraints_override_flag ) { | |
| 47 | slice_log2_diff_min_qt_min_cb_luma | ue(v) |
| 48 | slice_max_mtt_hierarchy_depth_luma | ue(v) |
| 49 | if( slice_max_mtt_hierarchy_depth_luma != 0 ) | |
| 50 | slice_log2_diff_max_bt_min_qt_luma | ue(v) |
| 51 | slice_log2_diff_max_tt_min_qt_luma | ue(v) |
| 52 | } | |
| 53 | if( slice_type = = I && qtbtt_dual_tree_intra_flag ) { | |
| 54 | slice_log2_diff_min_qt_min_cb_chroma | ue(v) |
| 55 | slice_max_mtt_hierarchy_depth_chroma | ue(v) |
| 56 | if( slice_max_mtt_hierarchy_depth_chroma != 0 ) | |
| 57 | slice_log2_diff_max_bt_min_qt_chroma | ue(v) |
| 58 | slice_log2_diff_max_tt_min_qt_chroma | ue(v) |
| 59 | } | |
| 60 | } | |
| 61 | } | |
| 62 | } | |
| 63 | if ( slice_type != I ) { | |
| 64 | if( sps_temporal_mvp_enabled_flag && !pps_temporal_mvp_enabled_idc ) | |
| 65 | slice_temporal_mvp_enabled_flag | u(1) |
| 66 | if( slice_type = = B && !pps_mvd_l1_zero_idc ) | |
| 67 | mvd_l1_zero_flag | u(1) |
| 68 | if( cabac_init_present_flag ) | |
| 69 | cabac_init_flag | u(1) |
| 70 | if( slice_temporal_mvp_enabled_flag ) { | |
| 71 | if( slice_type = = B && !pps_collocated_from_l0_idc ) | |
| 72 | collocated_from_l0_flag | u(1) |
| 73 | if( ( collocated_from_l0_flag && NumRefIdxActive[ 0 ] > 1 ) \|\| ( !collocated_from_l0_flag && NumRefIdxActive[ 1 ] > 1 ) ) | |
| 74 | collocated_ref_idx | ue(v) |
| 75 | } | |
| 76 | if( ( pps_weighted_pred_flag && slice_type = = P ) \|\| ( pps_weighted_bipred_flag && slice_type = = B ) ) | |
| 77 | slice_weighted_pred_flag | u(1) |
| 78 | if ( slice_weighted_pred_flag) | |
| 79 | pred_weight_table( ) | |
| 80 | if( !pps_six_minus_max_num_merge_cand_plus1 ) | |
| 81 | six_minus_max_num_merge_cand | ue(v) |
| 82 | if( sps_affine_enabled_flag && !pps_five_minus_max_num_subblock_merge_cand_plus1 ) | |
| 83 | five_minus_max_num_subblock_merge_cand | ue(v) |
| 84 | if( sps_fpel_mmvd_enabled_flag ) | |
| 85 | slice_fpel_mmvd_enabled_flag | u(1) |
| 86 | if( sps_bdof_dmvr_slice_present_flag ) | |
| 87 | slice_disable_bdof_dmvr_flag | u(1) |
| 88 | if( sps_triangle_enabled_flag && MaxNumMergeCand >= 2 && !pps_max_num_merge_cand_minus_max_num_triangle_cand_minus1 ) { | |
| 89 | max_num_merge_cand_minus_max_num_triangle_cand | ue(v) |
| 90 | } | |
| 91 | } | |
| 92 | if ( sps_ibc_enabled_flag ) | |
| 93 | slice_six_minus_max_num_ibc_merge_cand | ue(v) |
| 94 | if( sps_joint_cbcr_enabled_flag ) | |
| 95 | slice_joint_cbcr_sign_flag | u(1) |
| 96 | slice_qp_delta | se(v) |
| 97 | if( pps_slice_chroma_qp_offsets_present_flag ) { | |
| 98 | slice_cb_qp_offset | se(v) |
| 99 | slice_cr_qp_offset | se(v) |
| 100 | if( sps_joint_cbcr_enabled_flag ) | |
| 101 | slice_joint_cbcr_qp_offset | se(v) |
| 102 | } | |
| 103 | if( sps_sao_enabled_flag ) { | |

TABLE 8-continued

The disclosed general slice header syntax to signal slice-level weighted prediction flag

| | | Descriptor |
|---|---|---|
| 104 | slice_sao_luma_flag | u(1) |
| 105 | if( ChromaArrayType != 0 ) | |
| 106 | slice_sao_chroma_flag | u(1) |
| 107 | } | |
| 108 | if( sps_alf_enabled_flag ) { | |
| 109 | slice_alf_enabled_flag | u(1) |
| 110 | if( slice_alf_enabled_flag ) { | |
| 111 | slice_num_alf_aps_ids_luma | u(3) |
| 112 | for( i = 0; i < slice_num_alf_aps_ids_luma; i++ ) | |
| 113 | slice_alf_aps_id_luma[ i ] | u(3) |
| 114 | if( ChromaArrayType != 0 ) | |
| 115 | slice_alf_chroma_idc | u(2) |
| 116 | if( slice_alf_chroma_idc ) | |
| 117 | slice_alf_aps_id_chroma | u(3) |
| 118 | } | |
| 119 | } | |
| 120 | if ( !pps_dep_quant_enabled_flag ) | |
| 121 | dep_quant_enabled_flag | u(1) |
| 122 | if( !dep_quant_enabled_flag ) | |
| 123 | sign_data_hiding_enabled_flag | u(1) |
| 124 | if( deblocking_filter_override_enabled_flag ) | |
| 125 | deblocking_filter_override_flag | u(1) |
| 126 | if( deblocking_filter_override_flag ) { | |
| 127 | slice_deblocking_filter_disabled_flag | u(1) |
| 128 | if( !slice_deblocking_filter_disabled_flag ) { | |
| 129 | slice_beta_offset_div2 | se(v) |
| 130 | slice_tc_offset_div2 | se(v) |
| 131 | } | |
| 132 | } | |
| 133 | if( sps_lmcs_enabled_flag ) { | |
| 134 | slice_lmcs_enabled_flag | u(1) |
| 135 | if( slice_lmcs_enabled_flag ) { | |
| 136 | slice_lmcs_aps_id | u(2) |
| 137 | if( ChromaArrayType != 0 ) | |
| 138 | slice_chroma_residual_scale_flag | u(1) |
| 139 | } | |
| 140 | } | |
| 141 | if( sps_scaling_list_enabled_flag ) { | |
| 142 | slice_scaling_list_present_flag | u(1) |
| 143 | if( slice_scaling_list_present_flag ) | |
| 144 | slice_scaling_list_aps_id | u(3) |
| 145 | } | |
| 146 | if( entry_point_offsets_present_flag && NumEntryPoints > 0 ) { | |
| 147 | offset_len_minus1 | ue(v) |
| 148 | for( i = 0; i < NumEntryPoints; i++ ) | |
| 149 | entry_point_offset_minus1[ i ] | u(v) |
| 150 | } | |
| 151 | if( slice_header_extension_present_flag ) { | |
| 152 | slice_header_extension_length | ue(v) |
| 153 | for( i = 0; i < slice_header_extension_length; i++) | |
| 154 | slice_header_extension_data_byte[ i ] | u(8) |
| 155 | } | |
| 156 | byte_alignment( ) | |
| 157 | } | |

In particular, the following semantics can be used here:

slice_weighted_pred_flag equal to 0 specifies that weighted prediction is not applied to the current slice. In turn, slice_weighted_pred_flag equal to 1 specifies that the weighted prediction is applied to the current slice. When not presented, the value of slice_weighted_pred_flag is inferred to 0.

One of the embodiments discussed above relates to disabling TPM on a block level by a conformance constraint. In the case of a TPM coded block, the weighing factors for the luma and chroma components of the reference pictures for inter-predictor $P_0$ 710 and $P_1$ 720 (as shown is FIG. 7) should not be present.

For more details, refIdxA and predListFlagA specify the reference index and reference picture list of the inter-predictor P0 Similarly, refIdxB and predListFlagB specify the reference index and reference picture list of the inter-predictor P1.

The variable lumaWeightedFlag and chromaWeightedFlag are derived as follows:

lumaWeightedFlagA=predListFlagA?luma_weight_l1_flag[refIdxA]: luma_weight_l0_flag[refIdxA]

lumaWeightedFlagB=predListFlagB?luma_weight_l1_flag[refIdxB]: luma_weight_l0_flag[refIdxB]

chromaWeightedFlagA=predListFlagA?chroma_weight_l1_flag[refIdxA]:chroma_weight_l0_flag[refIdxA]

chromaWeightedFlagB=predListFlagB?chroma_weight_l1_flag[refIdxB]:chroma_weight_l0_flag[refIdxB]

lumaWeightedFlag=lumaWeightedFlagA||luma-WeightedFlagB chromaWeightedFlag=chroma WeightedFlagA||chroma-WeightedFlagB It is a requirement of the bitstream conformance that lumaWeightedFlag and chromaWeightedFlag should be equal to 0.

Another embodiment relates to disabling the blending weighted sample prediction process for a TPM coded block when the explicit weighted prediction is used.

FIG. 7 and FIG. 8 illustrate the basic idea behind this embodiment for TPM and GEO, respectively. It is noted that the embodiments for TPM might be also implemented for the GEO mode.

In the case of a TPM coded block, if the weighing factors for the luma or chroma component of the reference picture for inter-predictor $P_0$ 710 or $P_1$ 720 are present, the weighted process in accordance with the WP parameters (WP parameters 730 $\{w_0, O_0\}$ and WP parameters 740 $\{w_1, O_1\}$ for $P_0$ and $P_1$, respectively) is used to generate the inter-predictor block; otherwise, the weighted process in accordance with the blending weighted parameter is used to generate the inter-predictor block.

For more details, refIdxA and predListFlagA specify the reference index and reference picture list of the inter-predictor P0. Similary, refIdxB and predListFlagB specify the reference index and reference picture list of the inter-predictor P1.

The variable lumaWeightedFlag and chromaWeightedFlag are derived as follow:

lumaWeightedFlagA=predListFlagA?luma_weight_l1_flag[refIdxA]: luma_weight_l0_flag[refIdxA]

lumaWeightedFlagB=predListFlagB?luma_weight_l1_flag[refIdxB]: luma_weight_l0_flag[refIdxB]

chromaWeightedFlagA=predListFlagA?chroma_weight_l1_flag[refIdxA]:chroma_weight_l0_flag[refIdxA]

chromaWeightedFlagB=predListFlagB?chroma_weight_l1_flag[refIdxB]:chroma_weight_l0_flag[refIdxB]

lumaWeightedFlag=lumaWeightedFlagA||lumaWeightedFlagB chromaWeightedFlag=chroma WeightedFlagA||chroma-WeightedFlagB Then, if lumaWeightedFlag is true, the explicit weighted process is invoked. In turn, if lumaWeightedFlag is false, the blending weighted process is invoked. As well, the chroma component is decided by chromaWeightedFlag.

For an alternative embodiment, the weighted flag for all components are considered jointly. If one of lumaWeightedFlag or chromaWeightedFlag is true, the explicit weighted process is invoked; if both lumaWeightedFlag and chromaWeightedFlag are false, the blending weighted process is invoked.

The explicit weighted process for a rectangular block, predicted using bi-prediction mechanism, is performed as described below.

The inputs to this process are:
two variables nCbW and nCbH specifying the width and the height of the current coding block,
two (nCbW)×(nCbH) arrays predSamplesA and predSamplesB,
the prediction list flags, predListFlagA and predListFlagB,
the reference indices, refIdxA and refIdxB,
the variable cIdx specifying the color component index,
the sample bit depth, bitDepth.

The output of this process is the (nCbW)×(nCbH) array pbSamples of the prediction sample values.

The variable shift1 is set equal to Max(2, 14−bitDepth).

The variables log 2Wd, o0, o1, w0 and w1 are derived as follows:

If cIdx is equal to 0 for luma samples, the following applies:

log 2Wd=luma_log 2_weight_denom+shift1 w0=predListFlagA?LumaWeightL1[refIdxA]:LumaWeightL0[refIdxA]

w1=predListFlagB?LumaWeightL1[refIdxB]:LumaWeightL0[refIdxB]

o0=(predListFlagA?luma_offset_l1[refIdxA]:luma_offset_l0[refIdxA])<<(BitDepth$_Y$−8)

o1=(predListFlagB?luma_offset_l1[refIdxB]:luma_offset_l0[refIdxB])<<(BitDepth$_Y$−8)

Otherwise (cIdx is not equal to 0 for chroma samples), the following applies:

log 2Wd=ChromaLog2WeightDenom+shift1 w0=predListFlagA?ChromaWeightL1[refIdxA][cIdx−1]: ChromaWeightL0[refIdxA][cIdx−1]

w1=predListFlagA?ChromaWeightL1[refIdxB][cIdx−1]: ChromaWeightL0[refIdxB][cIdx−1]

o0=(predListFlagA?ChromaOffsetL1[refIdxA][cIdx−1]: ChromaOffsetL0[refIdxA][cIdx−1])<<(BitDepth$_C$−8)

o1=(predListFlagB?ChromaOffsetL1[refIdxB][cIdx−1]: ChromaOffsetL0[refIdxB][cIdx−1])<<(BitDepth$_C$−8)

The prediction sample pbSamples [x][y] with x=0 ... nCbW−1 and y=0 ... nCbH−1 are derived as follows:

pbSamples[x][y]=Clip3(0,(1<<bitDepth)−1, (predSamplesA[x][y]*w0+predSamplesB[x][y]*w1+ ((o0+o1+1)<<log 2Wd)>>(log 2Wd+1))

The parameters of the slice-level weighted prediction may be represented as a set of variables, assigned for each element of a reference picture list. The index of the element is denoted further as "i".

These parameters may comprise:
LumaWeightL0[i]
luma_offset_l0[i].

luma_offset_l0[i] is the additive offset applied to the luma prediction value for list 0 prediction using RefPicList[0][i]. The value of luma_offset_l0[i] shall be in the range of −128 to 127, inclusive. When luma_weight_l0_flag[i] is equal to 0, luma_offset_l0[i] is inferred to be equal to 0.

The variable LumaWeightL0[i] is derived to be equal to (1<<luma_log 2_weight_denom)+delta_luma_weight_l0[i].

When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log\ 2\_weight\_denom}$.

For the blending weighted process for a rectangular block predicted using bi-prediction mechanism, the following process is performed as described below.

The inputs to this process are:
two variables nCbW and nCbH specifying the width and the height of the current coding block,
two (nCbW)×(nCbH) arrays predSamplesLA and predSamplesLB,
a variable triangleDir specifying the partition direction,
a variable cIdx specifying color component index.

The output of this process is the (nCbW)×(nCbH) array pbSamples of prediction sample values.

The variable nCbR is derived as follows:

nCbR=(nCbW>nCbH)?(nCbW/nCbH):(nCbH/nCbW)

The variable bitDepth is derived as follows:
If cIdx is equal to 0, bitDepth is set equal to $BitDepth_Y$.
Otherwise, bitDepth is set equal to $BitDepth_C$.
The variables shift1 and offset1 are derived as follows:
The variable shift1 is set equal to Max(5, 17−bitDepth).
The variable offset1 is set equal to 1<<(shift1−1).
Depending on the values of triangleDir, wS, and cIdx, the prediction samples pbSamples [x][y] with x=0 . . . nCbW−1 and y=0 . . . nCbH−1 are derived as follows:
The variable wIdx is derived as follows:
If cIdx is equal to 0 and triangleDir is equal to 0, the following applies:
wIdx=(nCbW>nCbH)?(Clip3(0, 8, (x/nCbR−y)+4)): (Clip3(0, 8, (x−y/nCbR)+4))
Otherwise, if cIdx is equal to 0 and triangleDir is equal to 1, the following applies:
wIdx=(nCbW>nCbH)?(Clip3(0, 8, (nCbH−1−x/nCbR−y)+4)): (Clip3(0, 8, (nCbW−1−x−y/nCbR)+4))
Otherwise, if cIdx is greater than 0 and triangleDir is equal to 0, the following applies:
wIdx=(nCbW>nCbH)?(Clip3(0, 4, (x/nCbR−y)+2)): (Clip3(0, 4, (x−y/nCbR)+2))
Otherwise (if cIdx is greater than 0 and triangleDir is equal to 1), the following applies:
wIdx=(nCbW>nCbH)?(Clip3(0, 4, (nCbH−1−x/nCbR−y)+2)): (Clip3(0, 4, (nCbW−1−x−y/nCbR)+2))
The variable wValue specifying the weight of the prediction sample is derived using wIdx and cIdx as follows:

wValue=(cIdx==0)?Clip3(0,8,wIdx):Clip3(0,8, wIdx*2)

The prediction sample values are derived as follows:

pbSamples[x][y]=Clip3(0,(1<<bitDepth)−1, (predSamplesLA[x][y]*wValue+predSamplesLB[x][y] *(8−wValue)+offset1)>>shift1)

For geometric mode, the blending weighted process for a rectangular block predicted using bi-prediction mechanism, the following process is performed as described below.
The inputs to this process are:
two variables nCbW and nCbH specifying the width and the height of the current coding block,
two (nCbW)×(nCbH) arrays predSamplesLA and predSamplesLB,
a variable angleIdx specifying the angle index of the geometric partition,
a variable distanceIdx specizing the distance idx of the geometric partition,
a variable cIdx specifying color component index.

The output of this process are the (nCbW)×(nCbH) array pbSamples of prediction sample values and the variable partIdx.

The variable bitDepth is derived as follows:
If cIdx is equal to 0, bitDepth is set equal to $BitDepth_Y$.
Otherwise, bitDepth is set equal to $BitDepth_C$.
The variables shift1 and offset1 are derived as follows:
The variable shift1 is set equal to Max(5, 17−bitDepth).
The variable offset1 is set equal to 1<<(shift1−1).
The weights array $sampleWeight_L$[x][y] for luma and $sampleWeight_C$[x][y] for chroma with x=0 . . . nCbW−1 and y=0 . . . nCbH−1 are derived as follows: The value of the following variables are set:
hwRatio is set to nCbH/nCbW
displacementX is set to angleIdx
displacementY is set to (displacementX+8)%32
partIdx is set to angleIdx>=13 && angleIdx<=27?1:0
rho is set to the following value using the look-up tables denoted as Dis, specified in Table 8-12:
rho=(Dis[displacementX]<<8)+(Dis[displacementY] <<8)
If one of the following conditions is true, the variable shiftHor is set equal to 0:
angleIdx % 16 is equal to 8
angleIdx % 16 is not equal to 0 and hwRatio≥1
Otherwise, shiftHor is set equal to 1.
If shiftHor is equal to 0, offsetX and offsetY are derived as follows:
offsetX=(256−nCbW)>>1
offsetY=(256−nCbH)>>1+angleIdx<16? (distanceIdx*nCbH)>>3: −((distanceIdx*nCbH)>>3)
Otherwise, if shiftHor is equal to 1, offsetX and offsetY are derived as follows:
offsetX=(256−nCbW)>>1+angleIdx<16? (distanceIdx*nCbW)>>3: −((distanceIdx*nCbW)>>3)
offsetY=(256−nCbH)>>1
The variables weightIdx and weightIdxAbs are calculated using the look-up table Table 8-12 with x=0 . . . nCbW−1 and y=0 . . . nCbH−1 as follows:

weightIdx=(((x+offsetX)<<1)+1)*Dis[displacementX]+(((y+offsetY)<<1)+1))*Dis[displacementY]−rho.

weightIdxAbs=Clip3(0,26,abs(weightIdx)).

The value of $sampleWeight_L$[x][y] with x=0 . . . nCbW−1 and y=0 . . . nCbH−1 is set according to Table 8-13 denoted as GeoFilter:

$sampleWeight_L$[x][y]=weightIdx<=0?GeoFilter [weightIdxAbs]: 8−GeoFilter[weightIdxAbs]

The value $sampleWeight_C$[x][y] with x=0 . . . nCbW−1 and y=0 . . . nCbH−1 is set as follows:

$sampleWeight_C$[x][y]=$sampleWeight_L$[(x<<(SubWidthC−1))][(y<<(SubHeightC−1))]

NOTE—The value of sample $sampleWeight_L$[x][y] can also be derived from $sampleWeight_L$[x-shiftX][y-shiftY]. If the angleIdx is larger than 4 and smaller than 12, or angleIdx is larger than 20 and smaller than 24, shiftX is the tangent of the split angle and shiftY is 1. Otherwise, shiftX is 1 of the split angle and shiftY is the cotangent of the split angle. If the tangent (resp. cotangent) value is infinity, shiftX is 1 (resp. 0) or shift Y is 0 (reps. 1).

The prediction sample values are derived as follows with X denoted as L or C with cIdx is equal to 0 or not equal to 0:

pbSamples[x][y]=partIdx?

Clip3(0,(1<<bitDepth)−1, (predSamplesLA[x][y]*(8−sampleWeightx[x][y])+ predSamplesLB[x][y]*sampleWeightx[x][y]+ offset1)>>shift1): Clip3(0,(1<<bitDepth)−1, (predSamplesLA[x][y]*sampleWeightx[x][y]+pred-
SamplesLB[x][y]*(8−sampleWeightx[x][y])+
offset1)>>shift)

TABLE 9

Look-up table Dis for derivation of geometric partitioning distance.

| idx | 0 | 1 | 2 | 4 | 6 | 7 | 8 | 9 | 10 | 12 | 14 | 15 |
|---|---|---|---|---|---|---|---|---|---|---|---|---|
| Dis[idx] | 8 | 8 | 8 | 8 | 4 | 2 | 0 | −2 | −4 | −8 | −8 | −8 |

| idx | 16 | 17 | 18 | 20 | 22 | 23 | 24 | 25 | 26 | 28 | 30 | 31 |
|---|---|---|---|---|---|---|---|---|---|---|---|---|
| Dis[idx] | −8 | −8 | −8 | −8 | −4 | −2 | 0 | 2 | 4 | 8 | 8 | 8 |

TABLE 10

Filter weight look-up table GeoFilter for derivation
of geometric partitioning filter weights.

| idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| GeoFilter[idx] | 4 | 4 | 4 | 4 | 5 | 5 | 5 | 5 | 5 | 5 | 5 | 6 | 6 | 6 |

| idx | 14 | 15 | 16 | 17 | 18 | 19 | 20 | 21 | 22 | 23 | 24 | 25 | 26 |
|---|---|---|---|---|---|---|---|---|---|---|---|---|---|
| GeoFilter[idx] | 6 | 6 | 6 | 6 | 7 | 7 | 7 | 7 | 7 | 7 | 7 | 7 | 8 |

In the following, a brief explanation is provided for the envisaged applications of the encoding method as well as the decoding method as shown in the above-mentioned embodiments, and a system using them.

Figure 9:
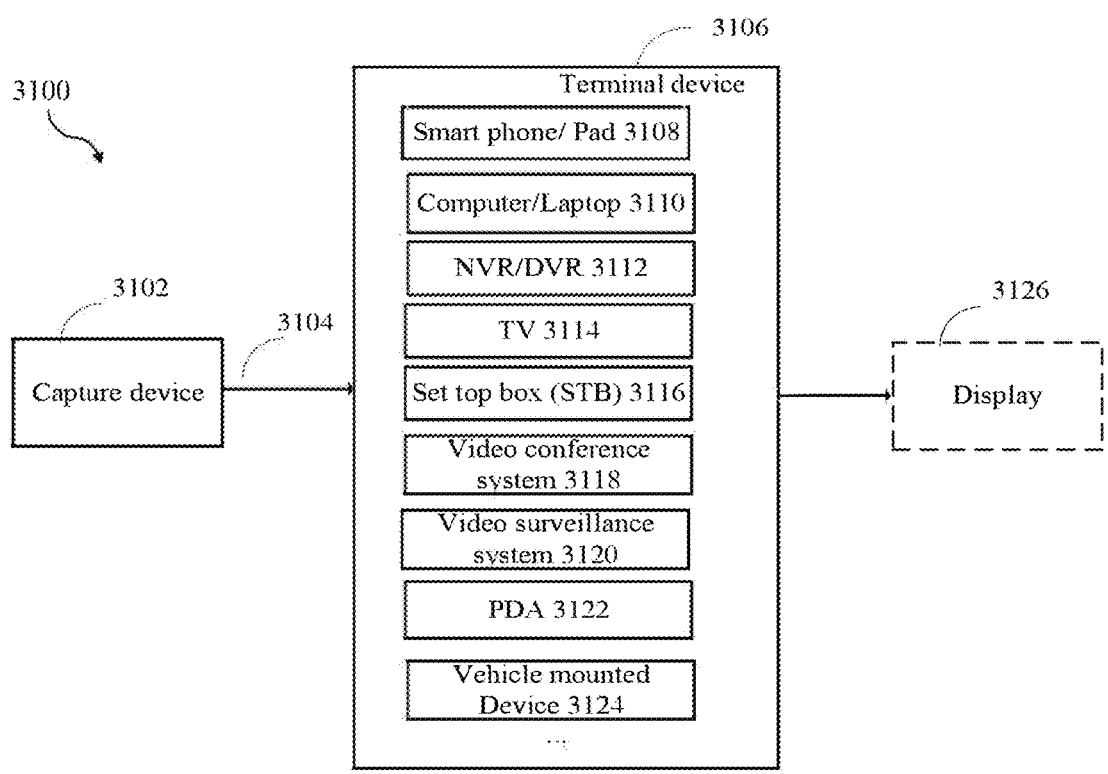
FIG. 9 is a block diagram showing an example structure of a content supply system 3100 which realizes a content delivery service.

FIG. 9 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to wireless fidelity (WIFI), Ethernet, Cable, wireless (3G/4G/5G), universal serial bus (USB), or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 10:
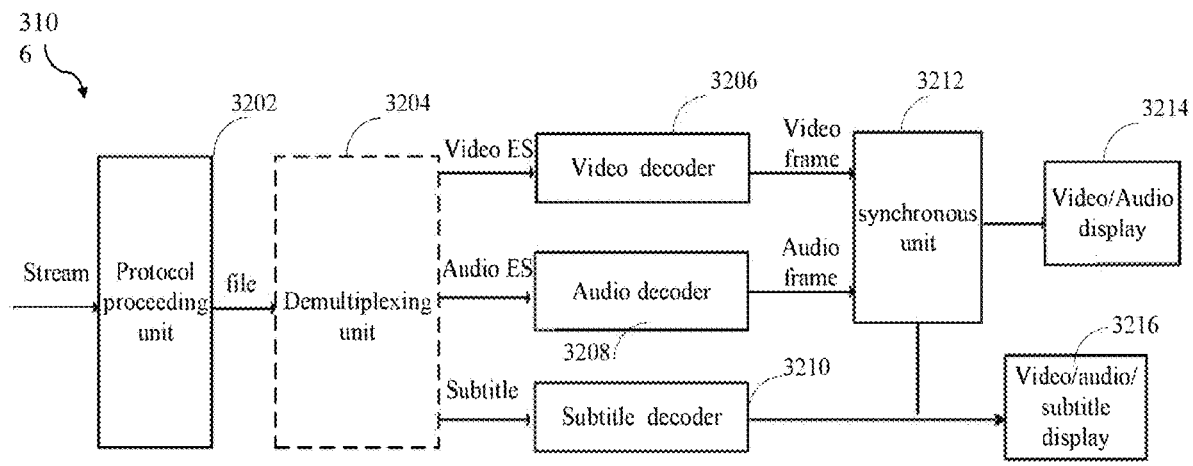
FIG. 10 is a block diagram showing a structure of an example of a terminal device.

FIG. 10 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 (e.g., protocol proceeding circuit) processes the stream, stream file is generated. The file is outputted to a demultiplexing unit 3204 (e.g., demultiplexing circuit). The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to a synchronous unit 3212 (e.g., synchronous circuit). The audio decoder 3208, decodes the audio ES to generate audio frame, and feeds this data to the synchronous unit 3212. Alternatively, the video frame may store in a buffer (not shown in FIG. 10) before feeding it to the synchronous unit 3212. Similarly, the audio frame may store in a buffer (not shown in FIG. 10) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithematic Operators

The following arithmetic operators are defined as follows:
+ Addition
− Subtraction (as a two-argument operator) or negation (as a unary prefix operator)
*Multiplication, including matrix multiplication
y Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y}$$

The summation of f(i) with i taking all integer values from x up to and including f(y. x % Modulus. Remainder of x divided by y, defined only for integers x and y with x>=y 0 and y>0.

Logical Operators

The following logical operators are defined as follows:
x && y Boolean logical "and" of x and y
x||y Boolean logical "or" of x and y
! Boolean logical "not"
x? y: z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.

-- Decrement, i.e., x-- is equivalent to x=x-1; when used in an array index, evaluates to the value of the variable prior to the decrement operation.

+= Increment by amount specified, i.e., x+=3 is equivalent to x=x+3, and x+=(-3) is equivalent to x=x+(-3).

-= Decrement by amount specified, i.e., x-=3 is equivalent to x=x-3, and x-=(-3) is equivalent to x=x-(-3).

Range Notation

The following notation is used to specify a range of values:

x=y . . . z X takes on integer values starting from y to z, inclusive, with x, y, and z being integer numbers and z being greater than y.

Mathematical Functions

The following mathematical functions are defined:

$$\text{Abs}(x) = \begin{cases} x & ; \; x >= 0 \\ -x & ; \; x < 0 \end{cases}$$

Asin(x) the trigonometric inverse sine function, operating on an argument x that is in the range of -1.0 to 1.0, inclusive, with an output value in the range of -π÷2 to π÷2, inclusive, in units of radians Atan(x) the trigonometric inverse tangent function, operating on an argument x, with an output value in the range of -π÷2 to π÷2, inclusive, in units of radians $$\text{Atan2}(y, x) = \begin{cases} \text{Atan}\left(\frac{y}{x}\right) & ; \; x > 0 \\ \text{Atan}\left(\frac{y}{x}\right) + \pi & ; \; x < 0 \;\&\&\; y >= 0 \\ \text{Atan}\left(\frac{y}{x}\right) - \pi & ; \; x < 0 \;\&\&\; y < 0 \\ +\frac{\pi}{2} & ; \; x == 0 \;\&\&\; y >= 0 \\ -\frac{\pi}{2} & ; \; \text{otherwise} \end{cases}$$

Ceil(x) the smallest integer greater than or equal to x.
Clip1$_Y$(x)=Clip3(0, (1<<BitDepth$_Y$)-1, x)
Clip1$_C$(x)=Clip3(0, (1<<BitDepth$_C$)-1, x)

$$\text{Clip3}(x, y, z) = \begin{cases} x & ; \; z < x \\ y & ; \; z > y \\ z & ; \; \text{otherwise} \end{cases}$$

Cos(x) the trigonometric cosine function operating on an argument x in units of radians.
Floor(x) the largest integer less than or equal to x.

$$\text{GetCurrMsb}(a, b, c, d) = \begin{cases} c+d & ; \; b-a >= d/2 \\ c-d & ; \; a-b < d/2 \\ c & ; \; \text{otherwise} \end{cases}$$

Ln(x) the natural logarithm of x (the base-e logarithm, where e is the natural logarithm base constant 2.718 281 828 . . . )
Log 2(x) the base-2 logarithm of x.
Log 10(x) the base-10 logarithm of x.

$$\text{Min}(x, y) = \begin{cases} x & ; \; x <= y \\ y & ; \; x > y \end{cases}$$

$$\text{Max}(x, y) = \begin{cases} x & ; \; x >= y \\ y & ; \; x < y \end{cases}$$

Round(x)=Sign(x)*Floor(Abs(x)+0.5)

$$\text{Sign}(x) = \begin{cases} 1 & ; \; x > 0 \\ 0 & ; \; x == 0 \\ -1 & ; \; x < 0 \end{cases}$$

Sin(x) the trigonometric sine function operating on an argument x in units of radians Sqrt(x)=$\sqrt{x}$ Swap(x, y)=(y, x)

Tan (x) the trigonometric tangent function operating on an argument x in units of radians.

Order of Operation Precedence

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE 11

| Operation precedence from highest (at top of table) to lowest (at bottom of table) | |
|---|---|
| 1 | operations (with operands x, y, and z) |
| 2 | "x++", "x- -" |
| 3 | "!x", "-x" (as a unary prefix operator) |
| 4 | $x^y$ |
| 5 | "x * y", "x / y", "x ÷ y", "$\frac{x}{y}$", "x % y" |
| 6 | "x + y", "x - y" (as a two-argument operator), "$\sum_{i=x}^{y} f(i)$" |
| 7 | "x << y", "x >> y" |
| 8 | "x < y", "x <= y", "x > y", "x >= y" |
| 9 | "x = = y", "x != y" |
| 10 | "x & y" |
| 11 | "x | y" |
| 12 | "x && y" |
| 13 | "x | | y" |
| 14 | "x ? y : z" |
| 15 | "x . . . y" |
| 16 | "x = y", "x += y", "x -= y" |

Text Description of Logical Operations

In the text, a statement of logical operations as would be described mathematically in the following form:

```
a.  if( condition 0 )
      statement 0
    else if( condition 1 )
      statement 1
    ...
    else /* informative remark on remaining condition */
      statement n
```

May be Described in the Following Manner:
 a. . . . as follows/ . . . the following applies:
  If condition 0, statement 0
  Otherwise, if condition 1, statement 1
  . . . .
  Otherwise (informative remark on remaining condition), statement n.

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
a.  if( condition 0a && condition 0b )
      statement 0
    else if( condition 1a || condition 1b )
      statement 1
    ...
    else
      statement n
```

May be Described in the Following Manner:
 a. . . . as follows/ . . . the following applies:
  If all of the following conditions are true, statement 0:
   condition 0a
   condition 0b
  Otherwise, if one or more of the following conditions are true, statement 1:
   condition 1a
   condition 1b
  . . .
  Otherwise, statement n In the text, a statement of logical operations as would be described mathematically in the following form:
 a. if (condition 0)
   statement 0
  if (condition 1)
   statement 1

May be Described in the Following Manner:
 a. When condition 0, statement 0
 b. When condition 1, statement 1.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Summarizing, the present disclosure relates to moving picture processing, and in particular to cases where non-rectangular partitioning modes are used for the inter-prediction in a combination with WP for coding fades. Non-rectangular modes refer to those inter-prediction modes, in which case a current block is partitioned/sliced in a non-rectangular way (slices). Such modes are triangular (e.g., TMP) or geometric (e.g., GEO) prediction. The aim of the disclosure is to harmonize non-rectangular partitioning modes with WP by way of disabling TMP/GEO when WP is applied. This may be accomplished by checking whether all reference pictures for a current slice are disabled, and if this is the case to disable the slice-level WP for non-rectangular prediction units. Whether the reference pictures are disabled may be determined based on conditions applied on set values, for example, of luma/chroma flags, which refer to the reference pictures. The dis-/enabling of slice-level WP may be also determined by parsing a bitstream for an indicator, whose value, indicates the type of the slice. The slice-level WP may also be disabled on a sub-block basis, in which case a current block is determined to be a rectangular subblock of a coding unit. When weighing factors of the reference picture are not included in the bitstream, prediction values are determined from blending weighted factors. The bitstream may carry further indicators (flags), the values of which depend on conditions on other flag values.

Additional aspects of the present disclosure are summarized in the following clauses:

Clause 1. An inter prediction method, comprising: determining slice-level weighted prediction is disabled in the event that the all reference pictures are disabled for the weighted perdition.

Clause 2. The method of clause 1, wherein the all reference pictures are disabled for the weighted perdition in the event that all following conditions are true: list0 luma weighted flags of the all reference pictures are 0; list1 luma weighted flags of the all reference pictures are 0; list0 chroma weighted flags of the all reference pictures are 0; and list1 chroma weighted flags of the all reference pictures are 0.

Clause 3. The method of clause 1 or 2, wherein determining slice-level weighted prediction is enabled in the event that any one of the all reference pictures is enabled for the weighted perdition.

Clause 4. The method of any one of clauses 1-3, wherein the preset reference picture set is an activate reference picture set for inter prediction of the current slice.

Clause 5. An inter prediction method, comprising: parsing an indicator from a bitstream corresponding to a current slice; and determining whether slice-level weighted prediction is enabled for the current slice according to a value of the indicator.

Clause 6. The method of clause 5, wherein the indicator is slice_weighted_pred_flag.

Clause 7. The method of clause 5 or 6, wherein slice-level weighted prediction is enabled for the current slice in the event that the value of the indicator is a first value.

Clause 8. The method of any one of clauses 5-7, wherein slice-level weighted prediction is disabled for the current slice in the event that the value of the indicator is a second value.

Clause 9. An inter prediction method, comprising: determining whether a current block is a sub-block of a coding unit (CU); and disabled triangle prediction mode (TPM) and/or geometric prediction mode (GEO) for the current block in the event that the current block is a sub-block of the coding unit.

Clause 10. The method of clause 9, wherein weighted factors of reference pictures of the current block are not carried by a bitstream.

Clause 11. An inter prediction method, comprising: determining whether weighing factors of reference pictures of the current block are carried by a bitstream in the event that the current block is processed by a sub-block based prediction mode; and obtaining a prediction value of the current block according to blending weighted parameters in the event that weighing factors are not carried by the bitstream.

Clause 12. The method of clause 11, wherein further comprising: obtaining a prediction value of the current block according to the weighing factors in the event that weighing factors are carried by the bitstream.

Clause 13. The method of clause 11 or 12, wherein the sub-block based prediction mode comprising a triangle prediction mode (TPM) or a geometric prediction mode (GEO).

Clause 14. An apparatus for inter prediction, comprising: a processor and a memory coupled to the processor; and the processor is configured to implement any one of clauses 1-13.

Clause 15. A bitstream corresponding to a current block, comprising a first indicator, wherein the first indicator is used to indicate a coding unit (CU) comprising the current block is processed with a sub-block based prediction mode; and the bitstream is forbidden to carry a second indictor, wherein the second indicator is used for indicate a weighted factor.

Clause 16. The bitstream of clause 15, wherein the first indicator is MergeTriangleFlag.

Clause 17. The bitstream of clause 15 or 16, wherein the sub-block based prediction mode comprising a triangle prediction mode (TPM) or a geometric prediction mode (GEO).

Clause 18. The bitstream of clause 17, wherein a prediction mode of the current block is a triangle prediction mode in the event that MergeTriangleFlag is a first value.

Clause 19. The bitstream of clause 18, wherein in the event that MergeTriangleFlag is a second value, further carries the second indictor.

LIST OF REFERENCE SIGNS

Figure 6:
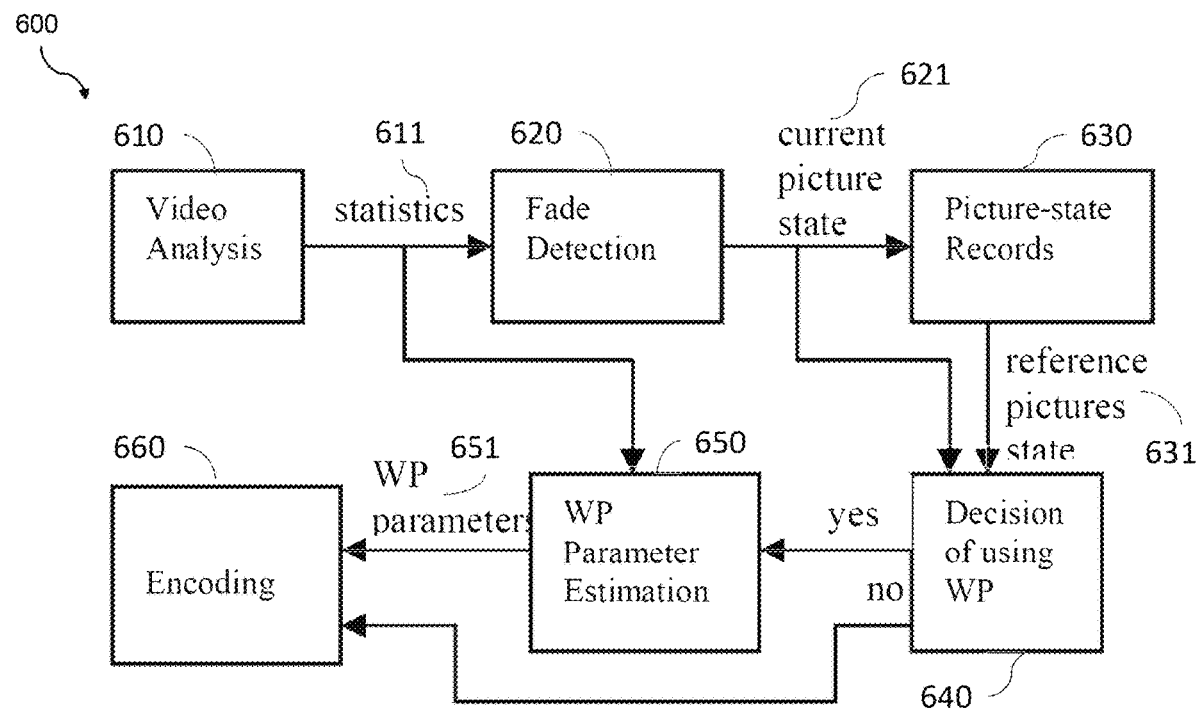
FIG. 6 is a flowchart for weighted prediction encoder-side decision making and parameter estimation.

FIG. 1A
10 video coding system
12 source device
13 communication channel
14 destination device
16 picture source
17 picture data
18 pre-processor
19 pre-processed picture data
20 video encoder
21 encoded picture data
22 communication interface
28 communication interface
30 video decoder
31 decoded picture data
32 post processor
33 post-processed picture data
34 display device
FIG. 1B
40 video coding system
41 imaging device(s)
42 antenna
43 processor(s)
44 memory store(s)
45 display device
46 processing circuitry
20 video encoder
30 video decoder FIG. 2
20 encoder
201 input (interface)
204 residual calculation [unit or step]
206 transform processing unit
208 quantization unit
210 inverse quantization unit
212 inverse transform processing unit
214 reconstruction unit
220 loop filter unit
230 decoded picture buffer (DPB)
244 inter prediction unit
254 intra prediction unit
260 mode selection unit
270 entropy encoding unit
272 output (interface)
262 partitioning unit
17 picture (data)
21 encoded picture data
203 picture block
205 residual block
207 transform coefficients
209 quantized coefficients
211 dequantized coefficients
213 reconstructed residual block
215 reconstructed block
221 filtered block
231 decoded picture
265 prediction block
266 syntax elements
FIG. 3
30 video decoder
304 entropy decoding unit
310 inverse quantization unit
312 inverse transform processing unit
314 reconstruction unit
320 loop filter
330 decoded picture buffer (DBP)
344 inter prediction unit
354 intra prediction unit
360 mode application unit
21 encoded picture data
309 quantized coefficients
311 dequantized coefficients
313 reconstructed residual block
315 reconstructed block
321 filtered block
331 decoded picture
332 output
365 prediction block
366 syntax elements
FIG. 4
400 video coding device
410 ingress ports/input ports
420 receiver units Rx
430 processor
440 transmitter units Tx
450 egress ports/output ports
460 memory
470 coding module
FIG. 5
500 source device or destination device
502 processor
504 memory
506 code and data
508 operating system
510 application programs
512 bus
518 display
FIG. 6
600 flowchart of weighting prediction (WP) procedure
FIG. 7
700 triangle prediction mode
710 inter-predictor p0
720 inter-predictor p1
730 weighting parameters WP of p0
740 weighting parameters WP for p1
750 current block
751 first triangular partition
752 second triangular partition
FIG. 8
800 geometric prediction mode
810 inter-predictor p0
820 inter-predictor p1
830 weighting parameters WP of p0
840 weighting parameters WP for p1
850 current block
85 first geometric partition
852 second geometric partition
FIG. 9
3100 content supply system
3102 capture device
3106 terminal device
3108 smart phone/pad
3110 computer/laptop
3112 NVR/DVR
3114 TV
3116 set top box (STB)
3118 video conference system
3120 video surveillance system
3122 PDA
3124 vehicle mounted device
3126 display
3104 communication link
FIG. 10
3106 terminal device
3202 protocol proceeding unit
3204 demultiplexing unit
3206 video decoder
3208 audio decoder
3210 subtitle decoder
3212 synchronous unit
3214 video/audio display
3216 video/audio subtitle display
FIG. 11
1100 flowchart of the inter-prediction method
FIG. 12
1200 flowchart of the inter-prediction method
FIG. 13
1300 flowchart of the inter-prediction method
FIG. 14
1400 flowchart of the inter-prediction method
FIG. 15
1500 inter-prediction module
1510 processor
1520 memory
FIG. 16
1600 inter-prediction module
1610 determining unit for reference picture dis-/enabling
1620 determining unit for non-rectangular prediction units dis-/enabling
1630 predictor unit
FIG. 17
1700 inter-prediction module 1710 parsing unit
1720 determining unit for non-rectangular prediction units dis-/enabling
1730 predictor unit
FIG. 18
1800 inter-prediction module
1810 determining unit of sub-block
1820 disabling unit for non-rectangular prediction mode
1830 predictor unit
FIG. 19
1900 inter-prediction module
1910 determining unit of weighing factors
1920 obtaining unit of prediction value

What is claimed is:

1. An inter prediction method, comprising:
determining whether reference pictures in a preset reference picture set of a current slice are disabled for a slice-level weighted prediction of the current slice;
determining that non-rectangular prediction units for the current slice are disabled for the slice-level weighted prediction, when the reference pictures are determined to be disabled; and
predicting the current slice in accordance with a determination result.

2. The method of claim 1, wherein the disabling of the reference pictures is indicated by one or more flags.

3. The method of claim 2, wherein the one or more flags include at least one of one or more luma-weighted flags or one or more chroma-weighted flags.

4. The method of claim 3, wherein the one or more luma-weighted flags and the one or more chroma-weighted flags each refer to a list0 and a list1 of the reference pictures, wherein the list0 includes reference pictures of a first predictor $P_0$ of the current slice and the list1 includes reference pictures of a second predictor $P_1$ of the current slice.

5. The method of claim 4, wherein the disabling of the reference pictures is indicated when all the following conditions are true:
the luma-weighted flags of the list0 are 0;
the luma-weighted flags of the list1 are 0;
the chroma-weighted flags of the list0 are 0; and
the chroma-weighted flags of the list1 are 0.

6. The method of claim 1, wherein the slice-level weighted prediction is enabled in the event that any one of the reference pictures is enabled for the weighted prediction.

7. The method according to claim 6, wherein the slice-level weighted prediction is a triangle prediction mode (TPM) or a geometric prediction mode (GEO).

8. An inter prediction method, comprising:
parsing an indicator from a bitstream corresponding to a current slice;
determining whether a slice-level weighted prediction for non-rectangular prediction units of the current slice is enabled for the current slice according to a value of the indicator; and
predicting the current slice in accordance with a determination result.

9. The method of claim 8, wherein the indicator is a flag.

10. The method of claim 9, wherein the flag is based on a type of the current slice.

11. The method of claim 8, wherein the slice-level weighted prediction is determined to be enabled when the value is a first value.

12. The method of claim 11, wherein the slice-level weighted prediction is disabled when the value is a second value different from the first value.

13. The method according to claim 8, wherein the slice-level weighted prediction is a non-rectangular prediction mode.

14. The method according to claim 13, wherein the non-rectangular prediction mode is a triangle prediction mode (TPM) or a geometric prediction mode (GEO).

15. An inter prediction method, comprising:
determining whether weighing factors of reference pictures of a current block are carried by a bitstream when the current block is processed by a sub-block based prediction mode for non-rectangular prediction units of the current block; and
obtaining a prediction value of the current block by blending weighted parameters when the weighing factors are not carried by the bitstream.

16. The method of claim 15, further comprising:
obtaining the prediction value of the current block according to the weighing factors when the weighing factors are carried by the bitstream.

17. The method of claim 15, wherein the sub-block based prediction mode is a non-rectangular prediction mode.

18. The method of claim 17, wherein the non-rectangular prediction mode comprises a triangle prediction mode (TPM) or a geometric prediction mode (GEO).

* * * * *